United States Patent [19]

Nishikawa et al.

[11] Patent Number: 5,315,823
[45] Date of Patent: May 31, 1994

[54] CONTROL APPARATUS FOR SPEEDILY WARMING UP CATALYST IN INTERNAL COMBUSTION ENGINE

[75] Inventors: Seiithirou Nishikawa; Toshiaki Kikuchi; Masumi Kinugawa, all of Okazaki, Japan

[73] Assignee: Nippondenso Co., Ltd., Kariya, Japan

[21] Appl. No.: 922,103

[22] Filed: Jul. 31, 1992

Related U.S. Application Data

[63] Continuation-in-part of Ser. No. 833,651, Feb. 11, 1992.

[30] Foreign Application Priority Data

| Feb. 12, 1991 | [JP] | Japan | 3-018695 |
| Jun. 21, 1991 | [JP] | Japan | 3-150640 |
| Jul. 31, 1991 | [JP] | Japan | 3-192353 |
| Dec. 24, 1991 | [JP] | Japan | 3-341259 |

[51] Int. Cl.$^5$ .................................................. F01N 3/00
[52] U.S. Cl. ................................................ 60/286; 60/285
[58] Field of Search ............... 60/285, 289, 286, 274, 60/276; 123/672, 676, 585

[56] References Cited

U.S. PATENT DOCUMENTS

| 3,751,941 | 8/1973 | Pollock | 60/284 |
| 3,813,877 | 6/1974 | Hunt | 60/284 |
| 4,007,590 | 2/1977 | Nagai | 60/284 |
| 4,132,198 | 1/1979 | Masaki | 60/285 |
| 4,351,297 | 9/1982 | Suematsu | 123/421 |
| 4,379,387 | 4/1983 | Iizuka | 60/285 |
| 4,574,588 | 3/1986 | Hayama | 60/285 |
| 4,617,793 | 10/1986 | Suzuki | 60/285 |
| 4,693,076 | 9/1987 | Chujo et al. | 60/274 |
| 4,974,414 | 12/1990 | Kono et al. | 60/286 |
| 5,090,199 | 2/1992 | Ikuta et al. | 60/285 |
| 5,115,639 | 5/1992 | Gopp | 60/285 |
| 5,129,228 | 7/1992 | Kondo | 60/285 |
| 5,136,842 | 8/1992 | Achleitner et al. | 60/274 |
| 5,138,833 | 8/1992 | Kabasin et al. | 60/285 |
| 5,158,658 | 10/1992 | Yoshida et al. | 60/274 |
| 5,163,290 | 11/1992 | Kinnear | 60/274 |
| 5,168,700 | 12/1992 | Furuya | 60/285 |

FOREIGN PATENT DOCUMENTS

| 51-74106 | 6/1976 | Japan . | |
| 51-121607 | 10/1976 | Japan . | |
| 51-44247 | 11/1976 | Japan . | |
| 51-126404 | 11/1976 | Japan . | |
| 52-10703 | 3/1977 | Japan . | |
| 57-51525 | 11/1982 | Japan | 60/285 |
| 61-58912 | 3/1986 | Japan | 123/676 |
| 61-234241 | 10/1986 | Japan | 60/285 |
| 62-247176 | 10/1987 | Japan . | |
| 1478652 | 7/1977 | United Kingdom | 123/676 |

OTHER PUBLICATIONS

Sakurai Shigenori; Apparatus for Purifying Exhaust Gas of Engine; Patent Abstracts of Japan; Mar. 22, 1983; vol. 007, No. 133.
Uchinami Masanobu; Air-fuel Ratio Controller; Patent Abstracts of Japan; Feb. 15, 1990; vol. 014, No. 209.
Ihara Kazunori; Exhaust Gas Purifying Device for Engine; Patent Abstracts of Japan; Aug. 30, 1991, vol. 015, No. 463.
Nakabayashi Katsuhiko; Air-fuel Ratio Control System; Patent Abstracts of Japan; Feb. 7, 1983; vol. 007, No. 98.
Sawamoto Hiroyuku; Air-Fuel Ratio Control Device for Internal Combustion Engine; Patent Abstracts of Japan; Jan. 24, 1991; vol. 015, No. 134.
Morikawa Koji; Engine Control Device of Two-Cycle Engine; Patent Abstracts of Japan; Jul. 16, 1991; vol. 015, No. 400.

*Primary Examiner*—Raymond A. Nelli
*Attorney, Agent, or Firm*—Cushman, Darby & Cushman

[57] ABSTRACT

A control apparatus for speedily warming up a catalyst disposed within an exhaust pipe connected to an internal combustion engine. The control apparatus calculates a demand fuel injection quantity into the engine on the basis of an operating state of said engine, and corrects the calculated demand fuel injection quantity on the basis of a warming-up state of a catalyst provided in an exhaust pipe of the engine so that an air fuel ratio in the engine is repeatedly controlled to a rich side and a lean side in a state that the warming-up of the catalyst is not completed. The control apparatus is equipped with an inhibiting function to inhibit the air fuel ratio from being controlled to the rich side and the lean side when the engine takes an operating state that the injection quantity is set to a rich side with respect to the theoretical air fuel ratio.

12 Claims, 28 Drawing Sheets

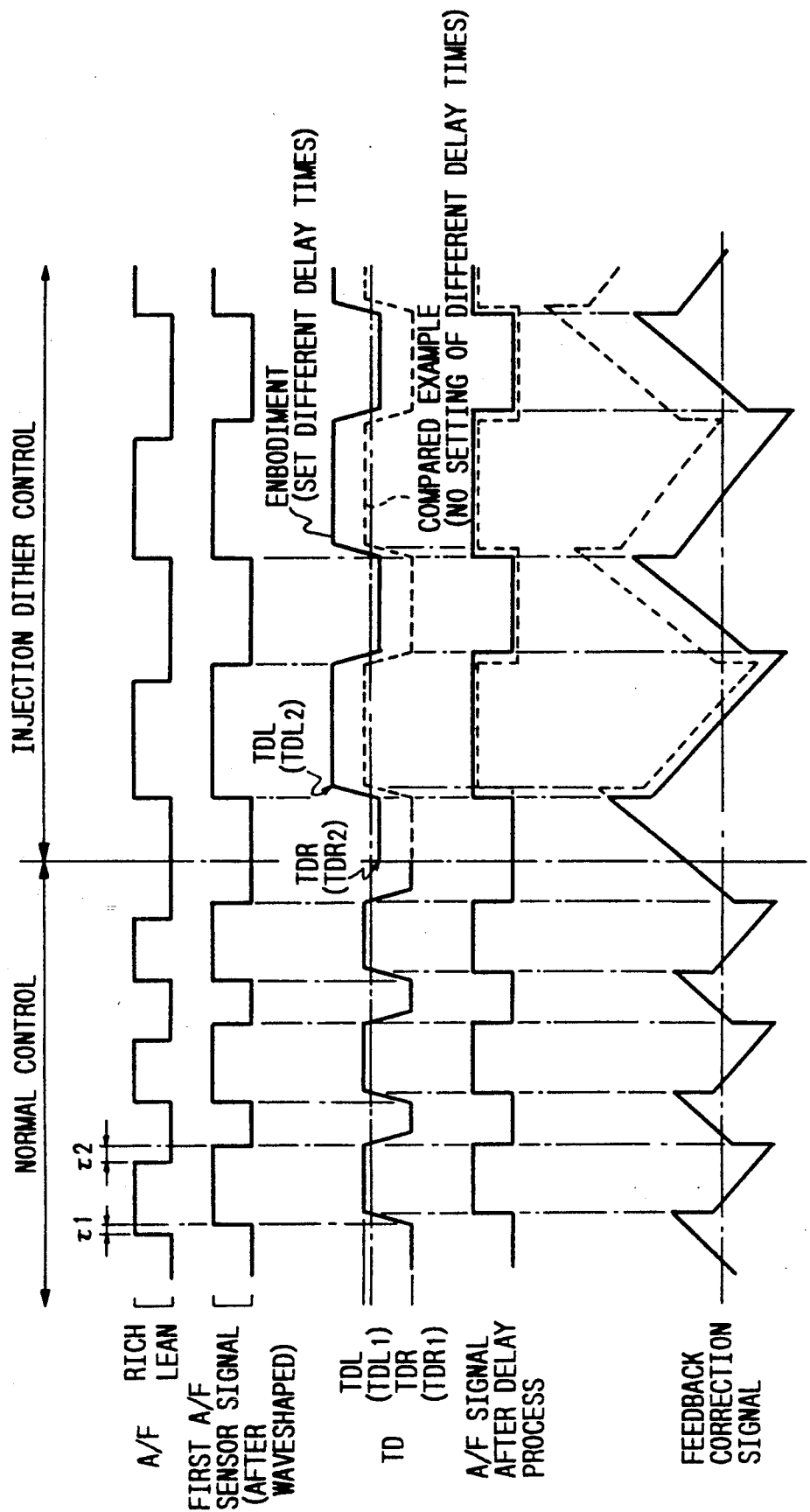

CONTROL APPARATUS FOR SPEEDILY WARMING UP CATALYST IN INTERNAL COMBUSTION ENGINE

CROSS-REFERENCE TO RELATED APPLICATION

This application is a continuation-in-part of U.S. patent application Ser. No. 833,651, filed on Feb. 11, 1992.

BACKGROUND OF THE INVENTION

The present invention relates to a control apparatus for speedily warming up a catalyst for purification of emissions generated from an internal combustion engine (which will be referred hereinafter to as an engine).

Various types of devices have hitherto been proposed which controls the ignition timing to a retardation side in the case that the engine is started at the time of being in a cooled state, thereby decreasing the maximum combustion temperature and increasing the temperature of emissions (exhaust gases) from the engine so as to reduce the hazardous components (HC, NOx) to be discharged from the engine. For example, according to the Japanese patent Publication No. 62-39269, the ignition timing is retardation-corrected in accordance with the cooling water temperature in the case that the engine is started at the time of being in a cooled state, and when the cooling water temperature reaches a predetermined temperature lower than the temperature corresponding to the fully warmed-up state of the engine, the retardation amount is decreased in accordance with the time period elasped from the time that the water temperature reaches the predetermined temperature so as to accelerate the increase in the emission temperature to speedily warm up the catalyst for purifying the emissions.

There is a problem which arises with the aforementioned device, however, in that difficulty is encountered to set the retardation amount to a large value because this retardation of the ignition timing causes reduction of the engine torque, thereby making it difficult to sufficiently warm up the catalyst due to the increase in the emission temperature resulting from the retardation control to require a long time period until reaching the temperature (the warming-up completing temperature) which allows the sufficient purification of the hazardous components of the emissions through the catalyst. This causes a problem in which the hazardous components are discharged into the atmosphere because of the insufficient purification action of the catalyst until the catalyst temperature reaches the warming-up completing temperature.

SUMMARY OF THE INVENTION

It is therefore an object of the present invention to provide an engine control apparatus which is capable of speedily completing the warming-up of the catalyst so as to reduce the discharged amount of the hazardous components of the emissions into the atmosphere.

In accordance with the present invention, there is provided an internal combustion engine control apparatus comprising: engine operating condition detecting means for detecting an operating condition of an internal combustion engine; fuel injection amount determining means for determining an appropriate fuel injection amount to obtain an appropriate air-fuel ratio based on the engine operating condition detected by the engine operating condition detecting means; a catalyst disposed within an exhaust pipe connected to the engine so as to purify emissions generated from the engine; temperature condition determining means for determining whether a temperature of the catalyst becomes an operating temperature at which the catalyst can effectively purify the emissions, characterised by further comprising adjusting means for adjusting the determined fuel amount in accordance with a determination by the temperature condition determining means that the catalyst temperature is lower than the operating temperature, so that the determined fuel amount is alternately adjusted to a rich amount and a lean amount with respect to the air-fuel ratio.

In accordance with this invention, there is also provided an internal combustion engine control apparatus comprising: engine operating condition detecting means for detecting an operating condition of an internal combustion engine; ignition timing determining means for determining an appropriate ignition timing of the engine based on the engine operating condition detected by the engine operating condition detecting means; a catalyst disposed within an exhaust pipe connected to the engine so as to purify emissions generated from the engine; temperature condition determining means for determining whether a temperature of the catalyst becomes an operating temperature at which the catalyst can effectively purify the emissions, characterised by further comprising retarding means for intermittently retarding the determined ignition timing in accordance with a determination by the temperature condition determining means that the catalyst temperature is lower than the operating temperature.

According to this invention, there is further provided an internal combustion engine control apparatus comprising: engine operating condition detecting means for detecting an operating condition of an internal combustion engine; fuel injection amount determining means for determining an appropriate fuel injection amount to obtain an appropriate air-fuel ratio based on the engine operating condition detected by the engine operating condition detecting means; ignition timing determining means for determining an appropriate ignition timing of the engine based on the engine operating condition detected by the engine operating condition detecting means; a catalyst disposed within an exhaust pipe connected to the engine so as to purify emissions generated from the engine; temperature condition determining means for determining whether a temperature of the catalyst becomes an operating temperature at which the catalyst can effectively purify the emissions, characterised by further comprising: adjusting means for adjusting the determined fuel amount in accordance with a determination by the temperature condition determining means that the catalyst temperature is lower than the operating temperature, so that the determined fuel amount is alternately adjusted to a rich amount and a lean amount with respect to the air-fuel ratio; and retarding means for retarding the determined ignition timing when the adjusting means adjusts the determined fuel amount to the rich amount.

According to this invention there is further provided an internal combustion engine control apparatus comprising: engine operating condition detecting means for detecting an operating condition of an internal combustion engine; fuel injection amount determining means for determining an appropriate fuel injection amount with regard to a stoichiometric air-fuel ratio based on the engine operating condition detected by the engine operating condition detecting means; ignition timing determining means for determining an appropriate ignition timing of the engine based on the engine operating condition detected by the engine operating condition detecting means; a catalyst disposed within an exhaust pipe connected to the engine so as to purify emissions generated from the engine; temperature condition determining means for determining whether a temperature of the catalyst becomes an operating temperature at which the catalyst can effectively purify emissions, characterised by further comprising: adjusting means for adjusting the determined fuel amount in accordance with a determination by the temperature condition determining means that the catalyst temperature is lower than the operating temperature, so that the determined temperature is alternately adjusted to a rich amount and a lean amount with respect to the stoichiometric air-fuel ratio at a first predetermined interval; and retarding means for retarding the determined ignition timing at a second predetermined interval which is shorter than the first interval, while the catalyst temperature is lower than the operating temperature.

Further, according to this invention, a control apparatus for an internal combustion engine includes means for supplying secondary air to a portion of an exhaust pipe of the engine which is at an upstream side of a catalyst provided in the exhaust pipe, and calculates a demand injection quantity on the basis of an operating state of the engine and corrects the calculated demand injection quantity on the basis of a warming-up state of the catalyst so that an air fuel ratio for the engine is controlled repeatedly to a rich side and lean side in a state that the warming-up of the catalyst is not completed.

In addition, according to this invention, a control apparatus for an internal combustion engine comprises first air fuel ratio sensor means provided at an upstream side of a catalyst for detecting a specific component density in the emissions from the engine, second air fuel ratio sensor means provided at a downstream side of the catalyst for detecting a specific component density in the emissions, and fuel injection control means for controlling fuel injection valve means so as to effect the fuel injection by a quantity corresponding to an operating state of the engine. The control apparatus adjusts, through air fuel ratio feedback means, the fuel injection quantity due to the fuel injection control means on the basis of an output of the first air fuel ratio sensor means to feedback-correct an air fuel ratio to the engine so that the air fuel ratio is close of a theoretical air fuel ratio, and changes, through feedback control constant changing means, an air fuel ratio feedback control constant on the basis of an output of the second air fuel ratio sensor means so that a central air fuel ratio due to the air fuel ratio feedback means approaches said theoretical air fuel ratio. The catalyst warming-up process is performed by adjusting the fuel injection quantity due to the fuel injection control means so that the air fuel ratio is compulsorily shifted to a rich side and a lean side with respect to the theoretical air fuel ratio at a predetermined time interval when the warming-up is not completed. A first air fuel ratio feedback control constant is set whereby a central air fuel ratio due to the air fuel ratio feedback means becomes the theoretical air fuel ratio when said catalyst warming-up means starts the catalyst warming-up process and a second air fuel ratio feedback control constant is set whereby the central air fuel ratio due to the air fuel ratio feedback means becomes the theoretical air fuel ratio when terminating the catalyst warming-up process.

Moreover, according to this invention, a control apparatus for an internal combustion engine comprises first air fuel ratio sensor means provided at an upstream side of a catalyst in an exhaust pipe of the engine for detecting a specific component density in the emissions from the engine, second air fuel ratio sensor means provided at a downstream side of the catalyst for detecting a specific component density in the emissions, and fuel injection control means for controlling fuel injection valve means so as to effect the fuel injection by a quantity corresponding to an operating state of the engine. The control apparatus adjusts, through air fuel ratio feedback means, the fuel injection quantity due to the fuel injection control means on the basis of an output of the first air fuel ratio sensor means to feedback-correct an air fuel ratio to the engine so that the air fuel ratio is close to a theoretical air fuel ratio, and changes, through delay time changing means, a delay time for an output decision of the first air fuel ratio sensor means in the air fuel ratio feedback means on the basis of an output of the second air fuel ratio sensor means so that an central air fuel ratio due to the air fuel ratio feedback means approaches said theoretical air fuel ratio. The catalyst warming-up process is performed by adjusting the fuel injection quantity due to the fuel injection control means so that the air fuel ratio is compulsorily shifted to a rich side and a lean side with respect to the theoretical air fuel ratio at a predetermined time interval when the warming-up is not completed. A first a first delay time, which acts as the delay time for the output decision of the first air fuel ratio sensor means, is set whereby a central air fuel ratio due to the air fuel ratio feedback means becomes the theoretical air fuel ratio when the catalyst warming-up means starts the catalyst warming-up process, and a second delay time, which acts as the delay time for the output decision of the first air fuel ratio sensor means, is set whereby the central air fuel ratio due to the air fuel ratio feedback means becomes the theoretical air fuel ratio when terminating the catalyst warming-up process.

Preferably, the control apparatus further comprises means for inhibiting the correction means from repeatedly controlling the air fuel ratio to the rich side and the lean side when said engine takes an operating state that the injection quantity is set to a rich side with respect to the theoretical air fuel ratio by the demand injection quantity calculating means.

Still further, according to this invention, a control apparatus calculates a demand fuel injection quantity into the engine on the basis of an operating state of said engine, and corrects the calculated demand fuel injection quantity on the basis of a warming-up state of a catalyst provided in an exhaust pipe of the engine so that an air fuel ratio in the engine is repeatedly controlled to a rich side and a lean side in a state that the warming-up of the catalyst is not completed. The control apparatus is equipped with an inhibiting function to inhibit the air fuel ratio from being controlled to the rich side and the lean side when the engine takes an operating state that the injection quantity is set to a rich side with respect to the theoretical air fuel ratio.

BRIEF DESCRIPTION OF THE DRAWINGS

The object and features of the present invention will become more readily apparent from the following detailed description of the preferred embodiments taken in conjunction with the accompanying drawings in which:

FIG. 32 is a timing chart showing an operation effected by a control apparatus according to the sixth embodiment of this invention.

DETAILED DESCRIPTION OF THE INVENTION

Figure 1:
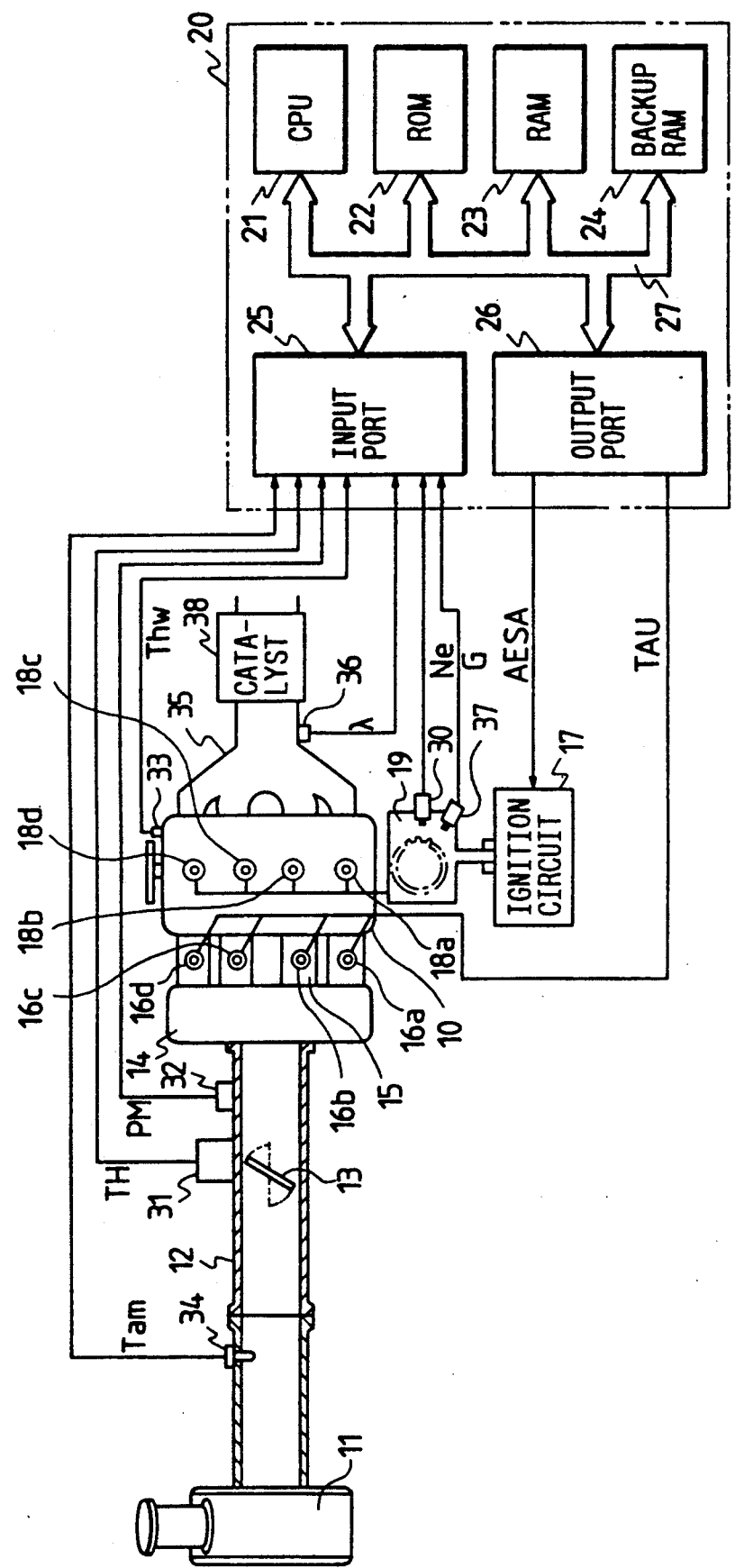
FIG. 1 is a schematic view showing an engine control apparatus according to the present invention which is provided in relation to an engine and the peripheral devices.

FIG. 1 schematically shows an engine control apparatus according to the present invention provided in relation to an engine designated at numeral 10, where the fuel injection control and the ignition timing control of the engine 10 is effected by an electronic control unit (ECU) designated at numeral 20. In FIG. 1, the engine 10 is of the 4-cylinder and 4-cycle spark ignition type, and the intake air introduced from the upstream side through an air cleaner 11, an intake pipe 12, a throttle valve 13, a surge tank 14 and an intake branching pipe 15 into each of the cylinders. On the other hand, fuel is arranged so as to be supplied from a fuel tank, not shown, under pressure and then injected thereinto through fuel injection valves 16a, 16b, 16c and 16d provided in the intake branching pipes 15. Further, the engine 10 is equipped with a distributor 19 for distributing the high-voltage electric signal from an ignition circuit 17 to ignition plugs 18a, 18b, 18c and 18d for the respective cylinders, a rotational speed sensor 30 provided in the distributor 19 for detecting the rotational speed Ne of the engine 10, a cylinder-identifying sensor 37 for identifying the cylinders of the engine 10, a throttle sensor for detecting the opening degree TH of the throttle valve 13, an intake air pressure sensor 32 for detecting an intake air pressure PM at a downstream side of the throttle valve 13, a warming-up sensor 33 for detecting the temperature of the cooling water of the engine 10, and an intake air temperature sensor 34 for detecting an intake air temperature Tam.

The aforementioned rotational speed sensor 30 is provided to be in opposed relation to a ring gear which rotates in synchronism with the crank shaft of the engine 10 so as to generate 24 pulse signals every two revolutions of the engine 10, i.e., every 720° CA., in proportion to the engine rotational speed Ne. Further, the cylinder-identifying sensor 37 is also provided to be in opposed relation to the ring gear which rotates in synchronism with the crank shaft of the engine 10 so as to output one pulse signal G at the top dead center of the compression stroke in a predetermined cylinder every two revolutions of the engine 10, i.e., 720° CA. The throttle sensor 31 outputs an analog signal corresponding to the throttle opening degree TH and is equipped with an idle switch for detecting the fully closing state of the throttle valve 13 to output an ON-OFF signal. In an exhaust pipe 35 of the engine 10 there is provided a catalytic converter rhodium 38 for reducing the hazardous components (CP, HC, NOx and others) of the emissions discharged from the engine 10. At the upstream side of the catalytic converter rhodium 38 there is provided an air-fuel ratio sensor 36 which is an oxygen concentration sensor for generating a linear detection signal corresponding to the air-fuel ratio λ of the air-fuel mixture supplied into the engine 10.

The electronic control unit 20 includes well-known CPU 21, ROM 22, RAM 23, backup RAM 24 and others so as to be constructed as an arithmetic and logic unit, these devices being coupled through a bus 27 to an input port 25 for inputting the above-mentioned sensors and further to an output port 26 for outputting a control signal to each of actuators. Through the input port 25, the electronic control unit 20 inputs the intake air pressure PM, intake air temperature Tam, throttle opening degree TH, cooling water temperature Thw, air-fuel ratio λ, rotational speed Ne and others so as to calculate the fuel injection amount TAU and the ignition timing AESA on the basis of the inputted data to output the corresponding control signals through the output port 26 to the fuel injection valves 16a to 16d and the ignition circuit 17. The fuel injection valves 16a to 16d are independently controlled for the injections.

A description will be made hereinbelow in terms of methods of speedily warming up the catalytic converter rhodium 38.

i) Method Based upon Retardation of Ignition Timing

Figure 2:
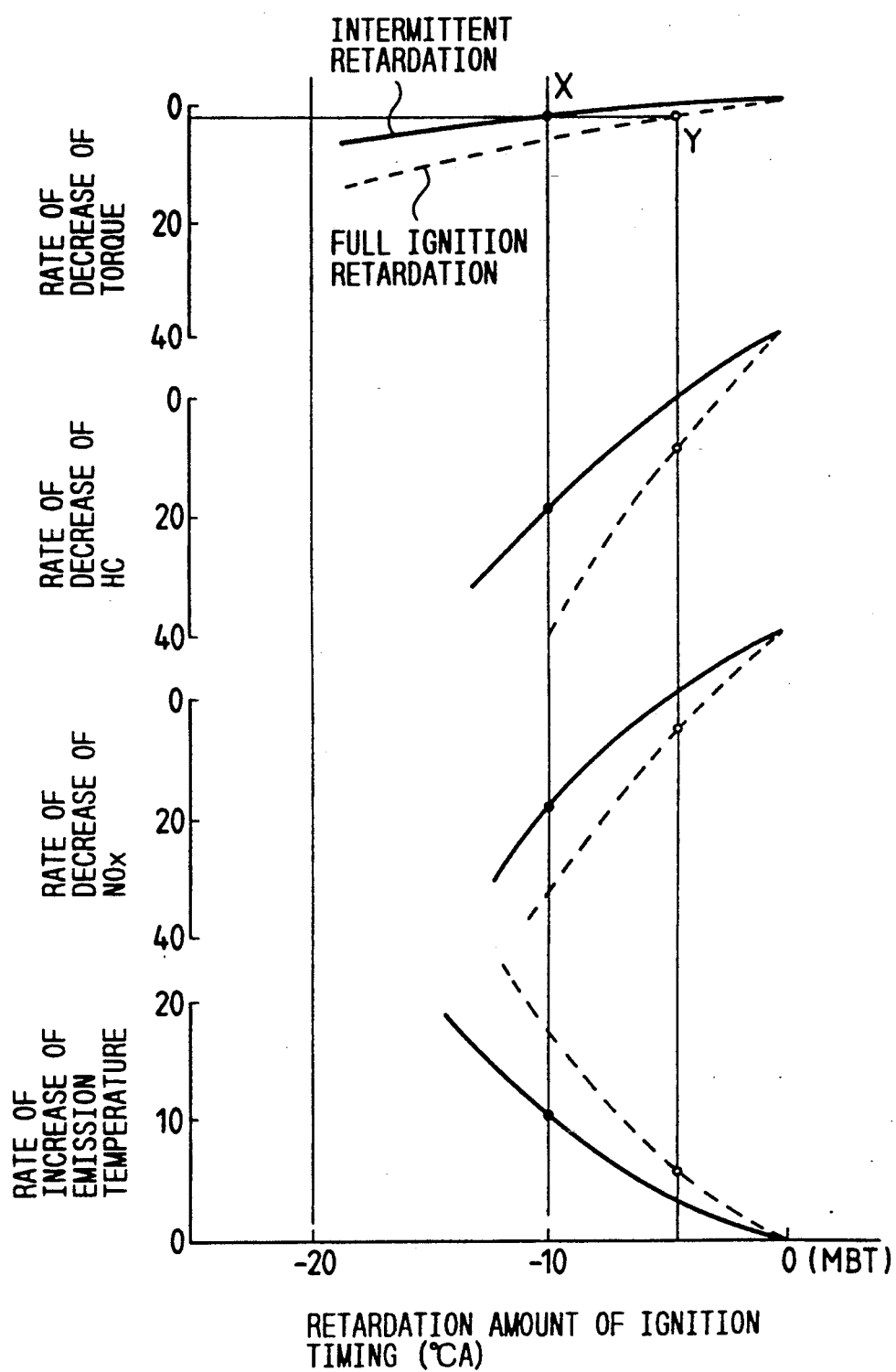
FIG. 2 is a characteristic graph showing the rate of increase of the emission temperature and the rate of decrease of the emissions in both the cases that the ignition timing is retarded in all the ignition cycles and the ignition timing is retarded intermittently, while a catalytic converter rhodium is warmed up.

FIG. 2 shows the rate of increase of the emission temperature and the rate of decrease of the emission in both the cases that the ignition is retarded in all the ignition cycles and the ignition timing is retarded intermittently (every other ignition cycle) while the catalytic converter rhodium 38 is warmed up. Although the engine torque decreases in response to the retardation of the ignition timing, in the case that both are compared with each other at the same torque decreasing point (X, Y), as compared with the case of the retardation of all the ignition timings, the intermittent retardation of the ignition timings allows the rate of decrease of the emission and the rate of increase of the emission temperature to be more heightened. Thus, the intermittent retardation causes the catalyst to be warmed up in an earlier stage as compared with the retardation of all the ignition timings, thereby suppressing the deterioration of the emissions.

ii) Method based upon Fuel Injection Dither Control

The fuel injection amount is increased at every combustion cycle so as to shift the air-fuel ratio between the rich side and the lean side with respect to the theoretical air-fuel ratio to alternately perform the rich combustion and the lean combustion. Here, carbon monoxide (CO) is generated at the time of the rich combustion and oxygen ($O_2$) is generated at the time of the lean combustion. The carbon monoxide and oxygen thus generated cause the oxidative reaction as indicated by the following formula, thereby generating a heat (Q).

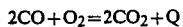

$2CO + O_2 = 2CO_2 + Q$

The heat (Q) generated due to this oxidative reaction allows the increase in the emission temperature to accelerate the warming-up of the catalytic converter rhodium 38.

This embodiment of this invention is arranged so as to warm up the catalytic converter rhodium in accordance with both the methods i) and ii).

Figure 3:
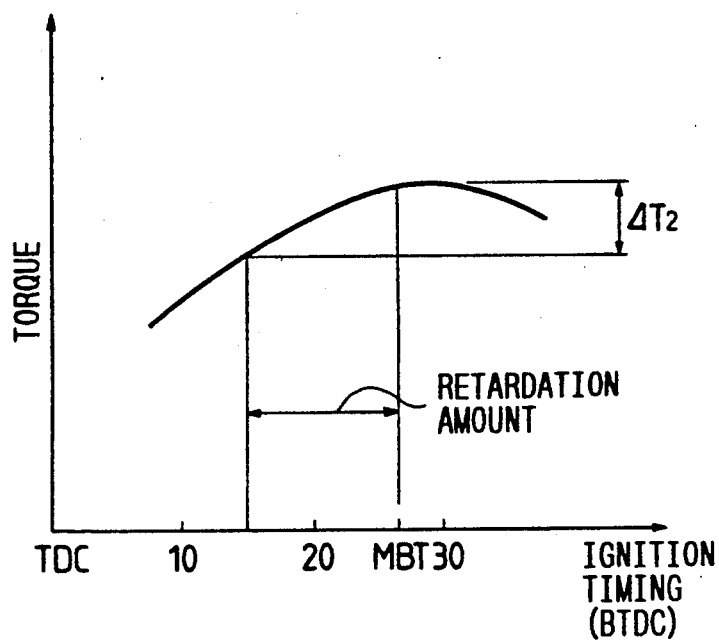
FIGS. 3 and 4 are graphic illustrations for describing variations of the engine torque due to the retardation control of the ignition timing and the fuel injection dither control.
Figure 4:
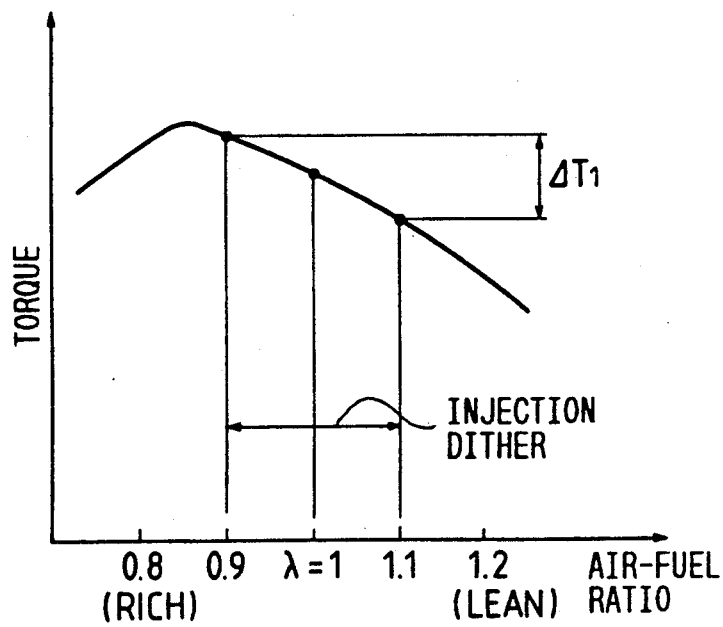

Here, the above-described retardation control and fuel injection dither control respectively cause variation of the engine torque as illustrated in FIGS. 3 and 4, and therefore both the control operations are required to be executed with the variation of the engine torque being suppressed. That is, when the air-fuel ratio is shifted (adjusted) to the rich side with respect to the theoretical air-fuel ratio (λ=1) to increase the torque, the ignition timing is shifted from MBT to TDC (top dead center) side, i.e., retarded, to decrease the torque so as to suppress the torque variation. On the other hand, when the air-fuel ratio is shifted to the lean side to decrease the torque, the retardation amount of the ignition timing is reduced, thereby increasing the torque to suppress the torque variation. At this time, if the dither range and the retardation amount are set so that the variation ΔT1 of the torque due to the injection dither control becomes equal or close to the variation ΔT2 due to the retardation control, it is possible to minimize the deterioration of the driveability caused by the torque variation.

Figure 5:
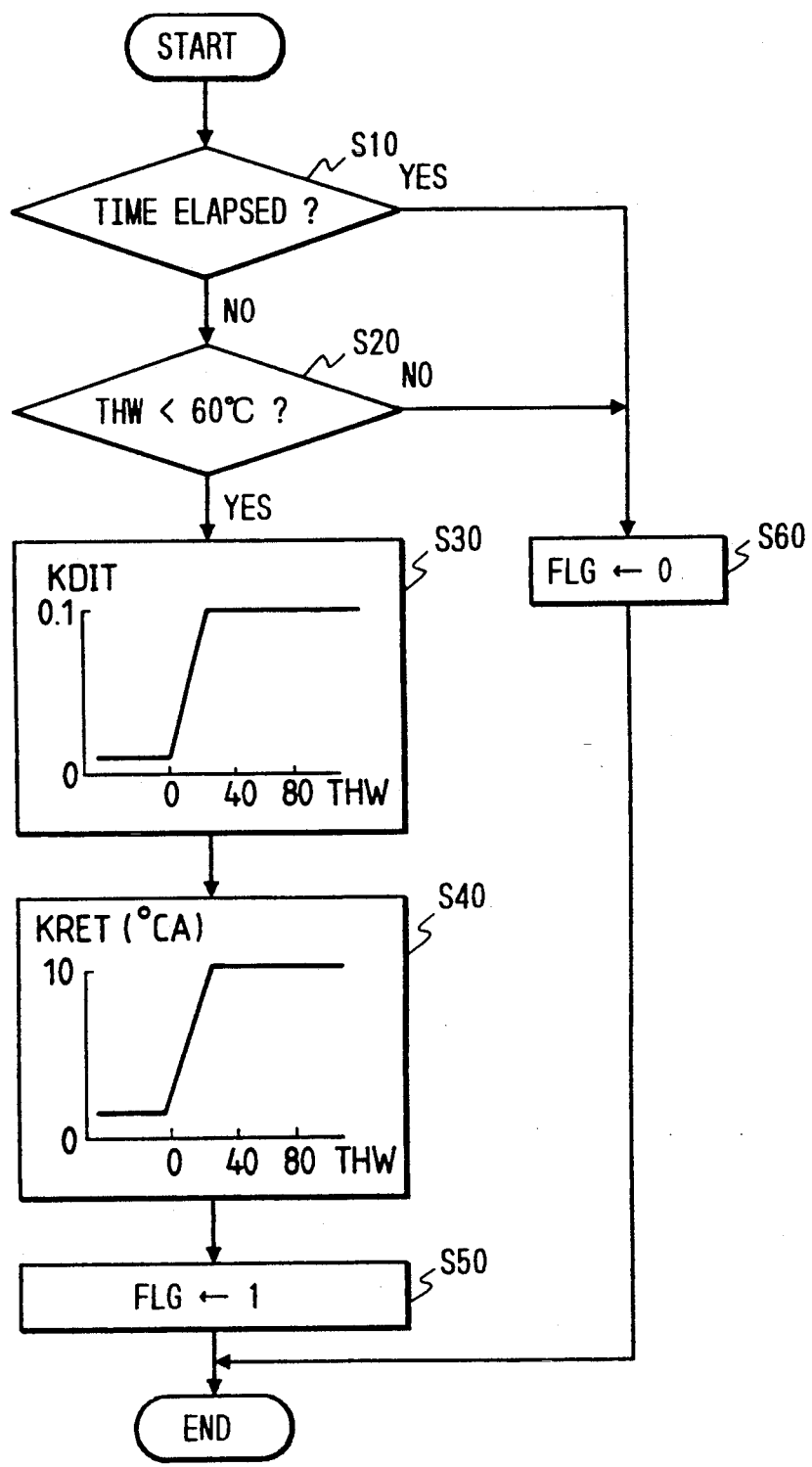
FIGS. 5 to 7 are flow charts for describing the intermittent retardation control and the injection dither control to be executed in a first embodiment of this invention.

Secondly, a description will be made hereinbelow with reference to FIGS. 5 to 7 in terms of the intermittent retardation control and the injection dither control to be executed in the electronic control unit 20. FIG. 5 shows a routine for calculating an injection dither coefficient KDIT and an intermittent retardation amount KRET, which routine is executed at every 40 ms. In FIG. 5, this routine starts with a step 10 (the step will be referred hereinafter to as S) to check whether a predetermined time period is elapsed from the start of the engine 10 (for example, Ne>500 rpm). This predetermined time period is a time period taken until the temperature of the catalytic converter rhodium 38 reaches the temperature at which the purification of the emissions can be effected and, for example, set to 100 seconds. If the decision of S10 is "NO", S20 follows to read the cooling water temperature THW to check whether the cooling water temperature THW is lower than 60° C. If "YES", control advances to S30 and S40 to calculate the dither coefficient KDIT and the intermittent retardation amount KRET on the basis of the cooling water temperature THW in accordance with maps previously stored in the ROM 22. The dither coefficient KDIT takes a value in a range of 0 to 0.1 and takes a greater value as the cooling water temperature THW becomes higher. This is because the misfire region in relation to the air-fuel ratio is wider when the cooling water temperature THW is lower and, although the air-fuel ratio cannot be shifted greatly to the rich side and lean side when the temperature is low, the air-fuel ratio can relatively be shifted greatly, as compared with the case of the low temperature, when the cooling water temperature THW heightens. Further, the intermittent retardation amount KRET takes a value in a range of 0° to 10° CA. and takes a greater value as the cooling water temperature THW becomes higher. This is because the torque variation due to the dither control is set to be substantially equal to the torque variation due to the intermittent retardation control in order to cancel the variation of the torque as described with reference to FIGS. 3 and 4. After the calculations of the injection dither coefficient KDIT and the intermittent retardation amount KRET in S30 and S40, S50 is then executed to set a decision flag FLG (FLG←1) which flag indicates whether the execution conditions for injection dither control and the intermittent retardation control are satisfied, thereafter terminating this routine. On the other hand, if the decision of S10 is made such that the predetermined time period has elapsed from the start or the decision of S20 is made such that the cooling water temperature Thw is above 60° C., the operational flow goes to S60 to clear the decision flag FLG (FLG←0), thereafter terminating this routine.

Further, a description will be made hereinbelow with reference to a flow chart of FIGS. 6 and 7 in terms of calculations of the final injection amount TAU and the final ignition timing AESA. This routine is started at every 180° CA. (top dead center of each of cylinders).

Figure 6:
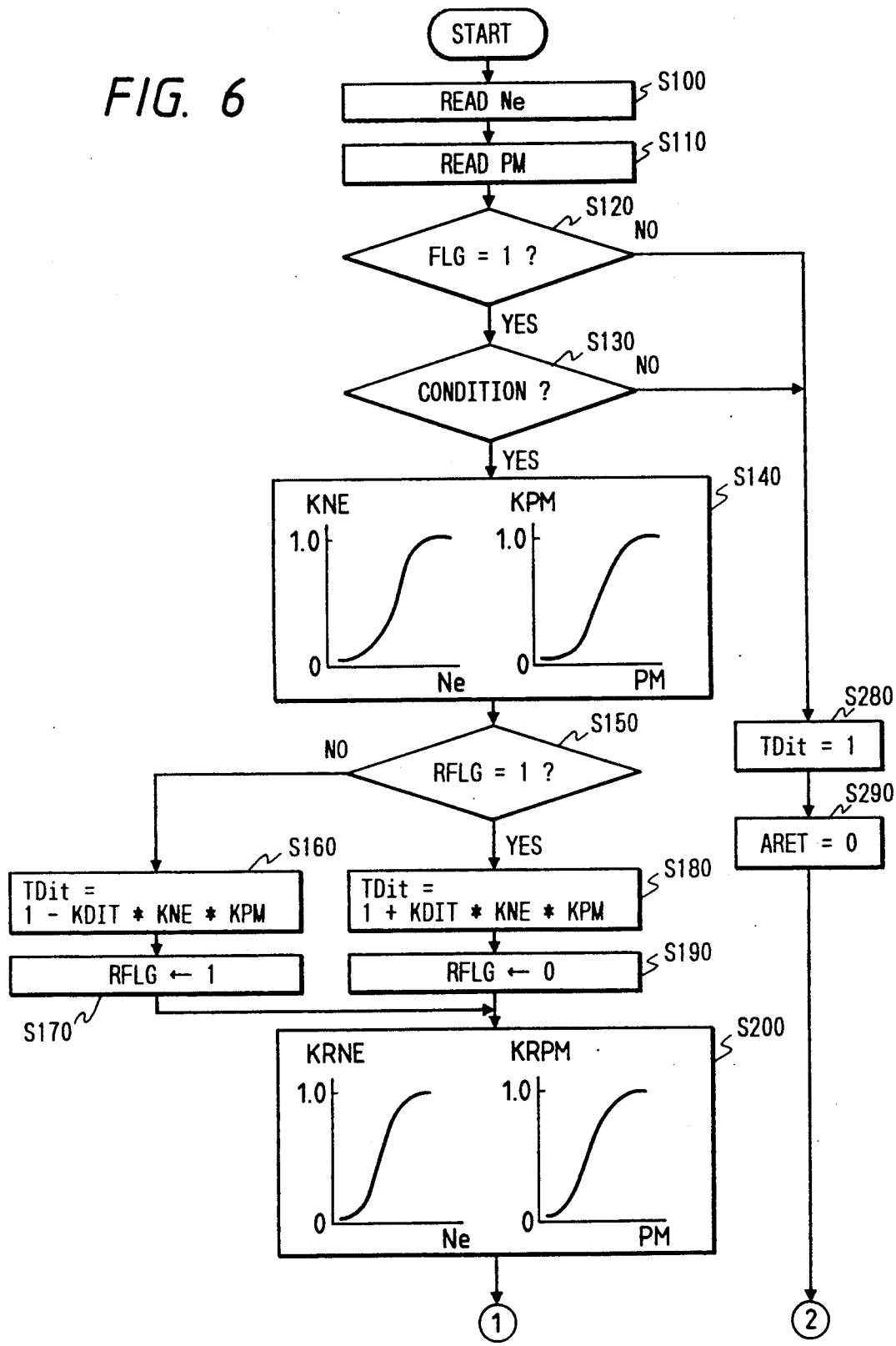
Figure 7:
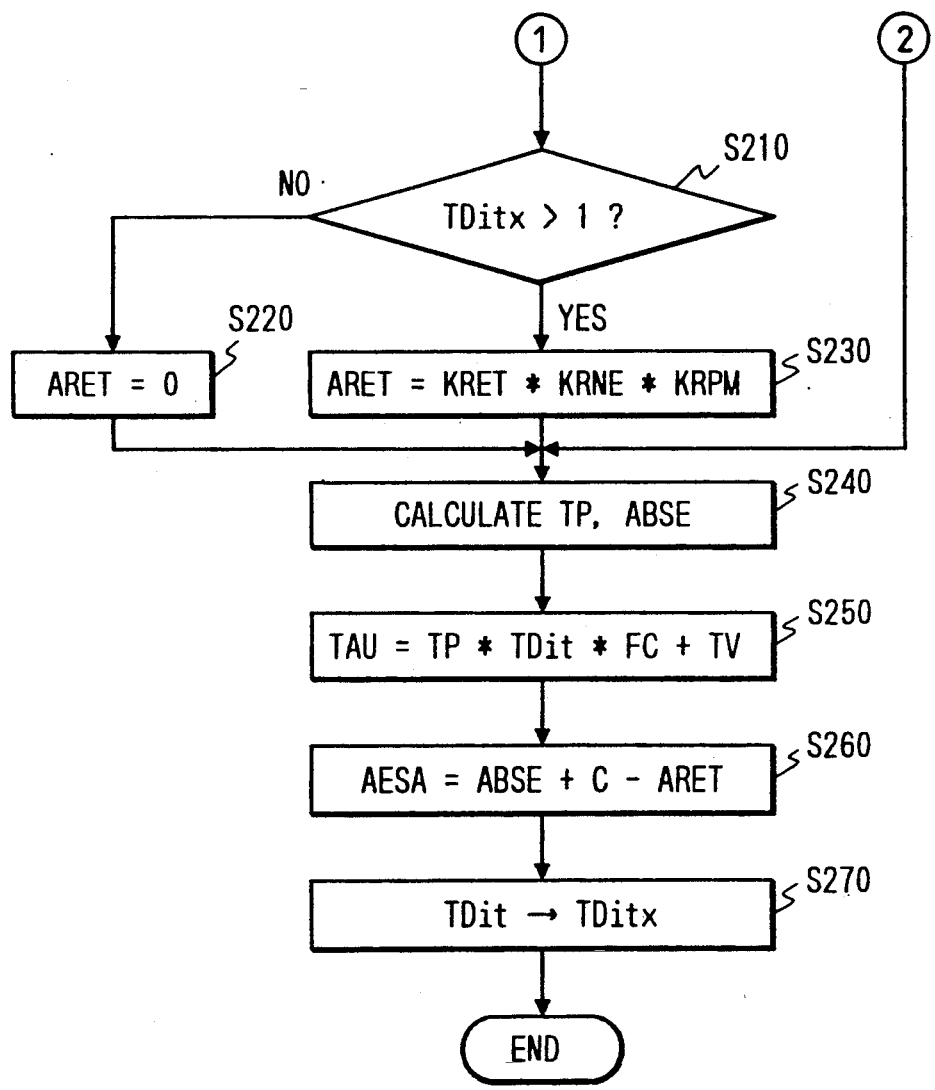

In FIGS. 6 and 7, S100 and S110 are first executed in order to read the engine rotational speed Ne and the intake air pressure PM, then followed by S120 to check whether the decision flag FLG is in the set state. If the decision flag FLG is set, S130 follows to check whether a specific condition is satisfied. Here, the specific condition means that the engine is not operated in a high-speed region or large-load region where the injection amount is set to the rich side with respect to the theoretical air-fuel ratio ($\lambda=1$) or not operated in a small-load region or low-speed region where the combustion is unstable, or that the engine is not in an accelerated state. When satisfying the specific condition, S140 follows to calculate dither correction amounts KNE and KPM for correction of the dither coefficient KDIT on the basis of the engine rotational speed Ne and the intake air pressure PM in accordance with maps, respectively. The maps are in advance stored in the ROM 22.

After the calculations of the dither correction amounts KNE and KPM in S140, S150 is executed to check whether a dither confirmation flag RFLG is set which indicates whether the air-fuel ratio has been shifted to the rich side or lean side in the previous cycle. When the flag RFLG is set (RFLG=1), i.e., when the air-fuel ratio is shifted to the lean side in the previous cycle, S180 is executed so as to perform the process for setting the air-fuel ratio to the rich side in the present cycle. In S180 the final dither coefficient TDit is calculated in accordance with the following equation.

$$TDit = 1 + KDIT \cdot KNE \cdot KPM$$

After the calculation of the final dither coefficient TDit in S180, A190 follows to reset the flag RFLG (RFLG←0), thereafter advancing to S200. On the other hand, if in S150 the flag RFLG is reset, that is, when the air-fuel ratio is shifted to the rich side in the previous cycle, S160 is executed in order to perform the process for setting the air-fuel ratio to the lean side in the present cycle. In S160 the final dither coefficient TDit is calculated in accordance with the following equation.

$$TDit = 1 - KDIT \cdot KNE \cdot KPM$$

After the calculation of the final dither coefficient TDit in S160, S170 follows to set the flag RFLG (RFLG←1), thereafter advancing to S200. In S200, correction amounts KRNE and KRPM for correction of the intermittent retardation amount KRET are calculated on the basis of the engine rotational speed Ne and the intake air pressure PM in accordance with maps, respectively. The maps is in advance stored in the ROM 22. In response to the calculations of the correction amounts KRNE and KRPM in S200, S210 follows to check whether the previous final dither coefficient TDitx is greater than 1 in order to determine whether the previously calculated air-fuel ratio has been set to the rich side. When TDitx is smaller than 1, that is, in the case that the previous air-fuel ratio is set to the lean side (as described with FIG. 4) so that the torque decreases, for suppressing the torque variation, S220 is executed so as to set the final retardation amount ARET to 0 whereby the ignition timing is not retarded. On the other hand, when S210 decides that TDitx is above 1, that is, in the case that the previous air-fuel ratio is set to the rich side to increase the torque, the ignition timing is retarded in order to suppress the torque variation.

Thus, in S230 the final retardation amount ARET is calculated in accordance with the following equation.

$$ARET = KRET \cdot KRNE \cdot KRPM$$

In response to the calculation of the final retardation amount ARET, S240 is executed to calculate the basic injection amount TP and the basic ignition timing ABSE in accordance with a two-dimensional map based on the engine rotational speed Ne and the intake air pressure PM. Further, S250 follows to calculate the final injection amount TAU by multiplying the final dither correction coefficient TDit and a basic injection amount correction coefficient FC by the basic injection amount TP and further adding an invalid injection time correction value TV to the multiplication result as indicated by the following equation.

$$TAU = TP \cdot TDit \cdot FC + TV$$

Thereafter, S260 is executed so as to calculate the final ignition timing AESA by adding a basic ignition timing correction amount C to the basic ignition timing ABSE and subtracting the final retardation amount ARET from the addition result as indicated by the following equation.

$$AESA = ABSE + C - ARET$$

Here, the final ignition timing AESA is indicative of an angle of BTDC (before top dead center).

After the calculation of the final ignition timing as described above, S270 is executed to rewrite TDit to TDitx, thereafter terminating this routine.

On the other hand, when in S120 the flag FLG is reset, that is, in the case that the execution condition of the injection dither and intermittent retardation control is not satisfied, or in the case that in S130 the specific condition is not satisfied, S280 follows to set the final dither correction coefficient TDit to 1, then followed by S290 to set the final retardation amount ARET to 0. Thus, when the decision of S120 or S130 is "NO", in S250 and S260 the dither control is not executed with respect to the injection amount and the intermittent retardation control is not effected with respect to the ignition timing.

As described above, the air-fuel ratio is shifted to the rich and lean sides at every combustion, and the retardation control of the ignition timing is performed (every other ignition cycle) only when the air-fuel ratio is shifted to the rich side.

Figure 8:
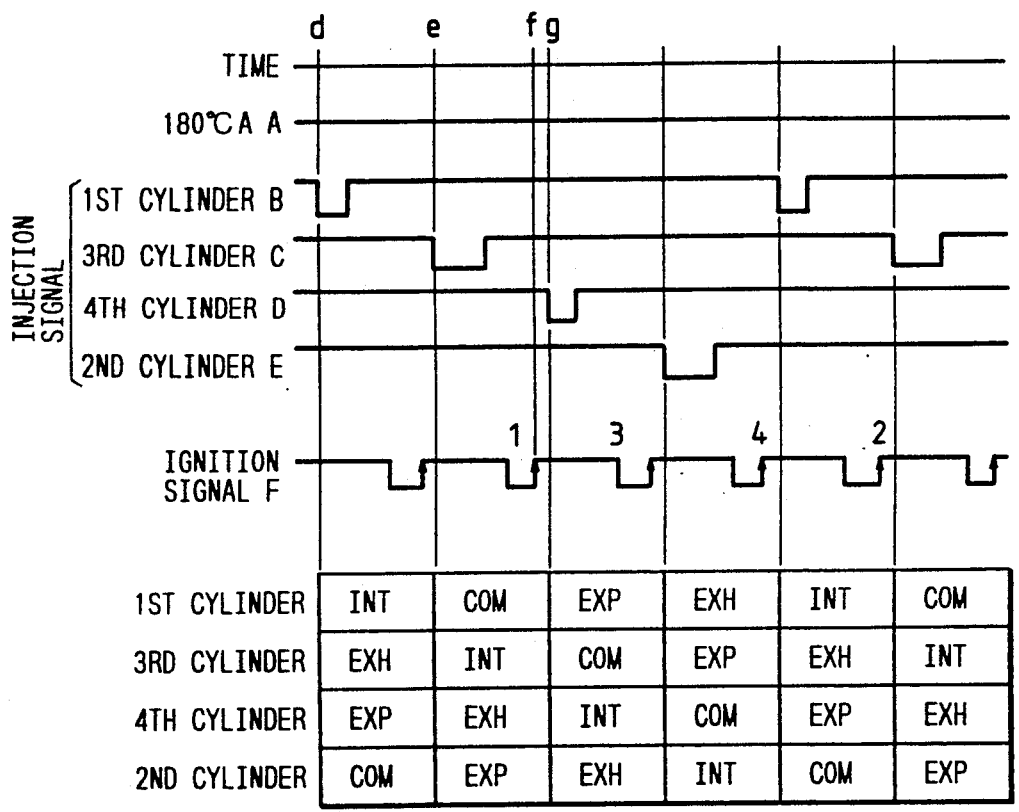
FIG. 8 is a timing chart of ignition and injection for describing the first embodiment of this invention.

The above-described consecutive operations of the electronic control unit 20 will be described with reference to a time chart of FIG. 8 where INT represents an intake stroke, COM designates a compression stroke, EXP depicts an explosion stroke and EXH denotes an exhaust stroke. In FIG. 8, a signal A is a crank position signal to be generated at every 180° CA (one per 6 signals each being generated at every 30° CA) and generated at the top dead center of each of the engine cylinders, signals B to E are injection pulse signals for respectively driving the injectors 16a, 16c, 16d and 16b provided in the first, third, fourth and second cylinders, and a signal F indicates an ignition pulse signal. The routine shown in FIGS. 6 and 7 is started in response to each input of the signal A. Now, let it be assumed that the routine shown in FIGS. 6 and 7 starts at the time e. After elapsed by several tens microseconds from the time e (after the completion of the routine of FIGS. 6 and 7), an injection signal corresponding to the final injection amount TAU calculated in S250 is outputted to the third cylinder. Here, the final ignition timing AESA calculated in S260 of the routine started at the time e is the ignition timing corresponding to the first-cylinder final injection amount TAU calculated at the time of the previous start (the time d). That is, the final ignition timing AESA calculated in the routine started at the time e corresponds to the time f, and the time f is the time that the first-cylinder final injection amount TAU calculated in the routine started at the time d is injected during the intake stroke of the first cylinder before completing the compression stroke. Thus, the ignition signal at the time f is led to the first-cylinder ignition plug 18a whereby the first cylinder takes the explosion stroke. Similarly, the final injection amount TAU calculated in the routine started at the time g is for the fourth cylinder, and the final ignition timing AESA calculated at that time is for the third cylinder.

Thus, the cylinder into which the rich-side final injection amount TAU is injected is ignited at the final ignition timing AESA retarded, and the cylinder into which the lean-side final injection amount TAU is injected is ignited at the final ignition timing AESA which is not retarded. The final injection amount TAU is alternately shifted to the lean and rich sides in order of the first, third, fourth and second cylinders, and the ignition timing is intermittently retarded at every other ignition cycle.

Although in the above-described embodiment the injection amount is shifted to the rich and lean sides at every injection cycle, it is appropriate that the injection amount is shifted to the rich and lean sides at every two injection cycles. At this time, the ignition timing is intermittently retarded only when it is shifted to the rich side, thereby suppressing the variation of the torque. Further, it is also appropriate that the fuel injection amount is not shifted to the lean and rich sides at every predetermined injection cycles, but the fuel injection amount is shifted to the lean and rich sides at every predetermined time period and the ignition timing is intermittently retarded at every predetermined time period.

Figure 9:
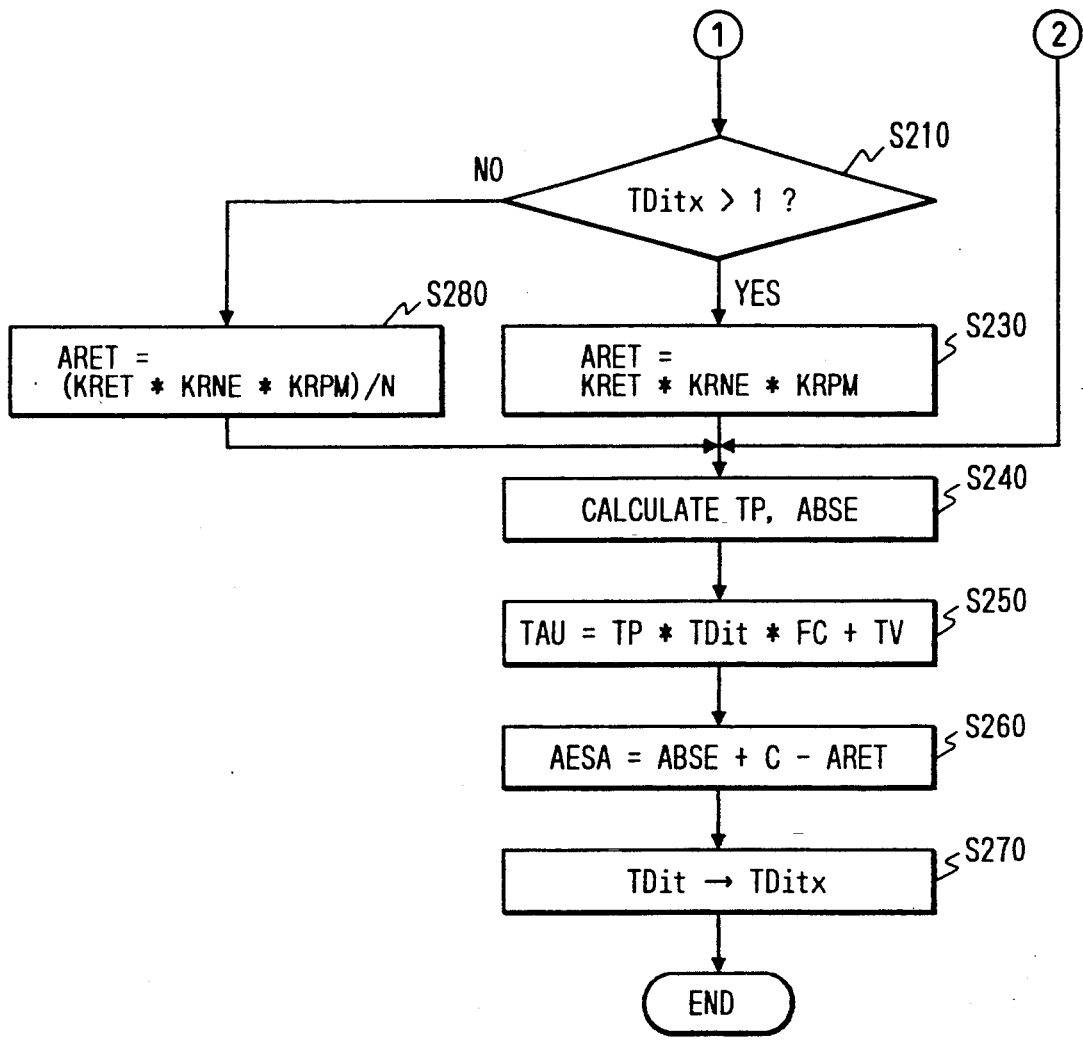
FIG. 9 is a flow chart showing an operation according to a second embodiment of the present invention.

FIG. 9 is a flow chart showing a second embodiment of the present invention where steps corresponding to those on FIGS. 6 and 7 are indicated with the same marks and the description thereof will be omitted for brevity. As shown in FIG. 9, when the previous air-fuel ratio is shifted to the lean side, that is, when the decision of S210 is made such that the previous final dither correction coefficient TDit is below 1, S280 is executed in order to calculate the final retardation amount ARET in accordance with the following equation.

$ARET = (KRET \cdot KRNE \cdot KRPM)/N$

This value corresponds to 1/N of the retardation amount (KRET·KRNE·KRPM) calculated in S230 when the air-fuel ratio is shifted to the rich side. For example, N is set to 5. That is, when the air-fuel ratio is shifted to the lean side, the ignition timing is retarded by 1/5 of the retardation amount calculated in the case of being shifted to the rich side. The other operations are similar to those in FIG. 7.

Furthermore, a description will be made hereinbelow in terms of a third embodiment of this invention which is for a group injection system. In view of the quick warming-up of the catalyst and improvement of the emissions, the effect is greater as the injection dither amount and the intermittent retardation amount becomes larger, while, considering the margin of misfire, fuel consumption, torque and others, the small injection dither amount and intermittent retardation amount is preferable. From both the viewpoints, as a result of the tests, this applicant confirmed the fact that it is preferable that the injection amount is shifted by about ±10% and the ignition timing is intermittently retarded by about 10° CA. However, since the torque variation in the case that the injection amount is shifted by about ±10% is smaller than the torque variation in the case that the ignition timing is retarded by 10° CA., the ignition timing retardation becomes great as the torque variation factor and the torque variation can be accelerated when continued so as to result in deterioration of the driveability. Accordingly, in a group injection system where 2 ignitions are effected with respect to one injection, the retardation for 2 ignitions is not performed at every injection (when being shifted to the rich side) but only one of two ignition timings per one injection is retarded. This can more effectively suppress the torque variation. That is, the period of the intermittent retardation is not set to be equal to the period of the injection, but set to be shorter than the period of the injection, whereby the torque variation can be suppressed.

Figure 10:
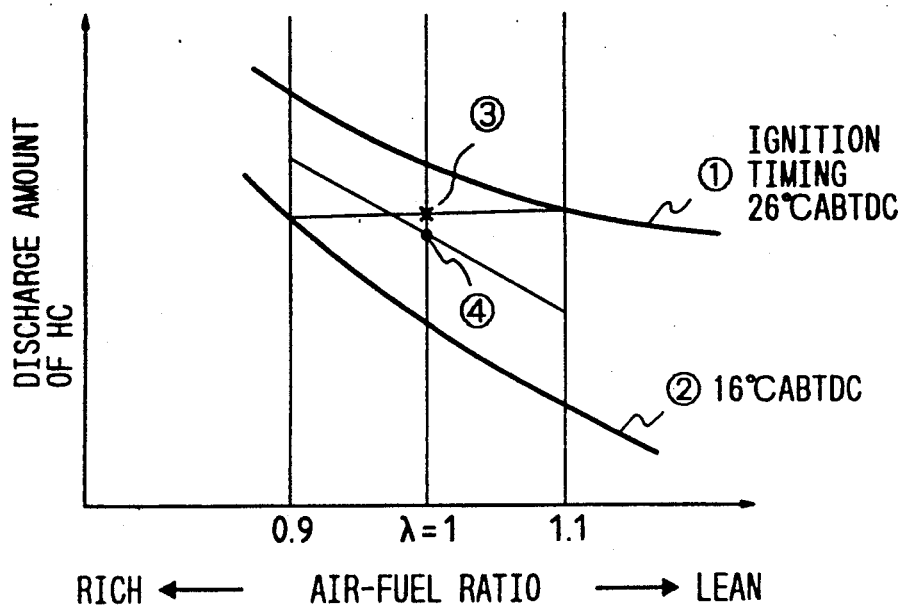
FIG. 10 is a graphic illustration for describing the relation between the retardation of the ignition timing and the discharge amount of HC.
Figure 11:
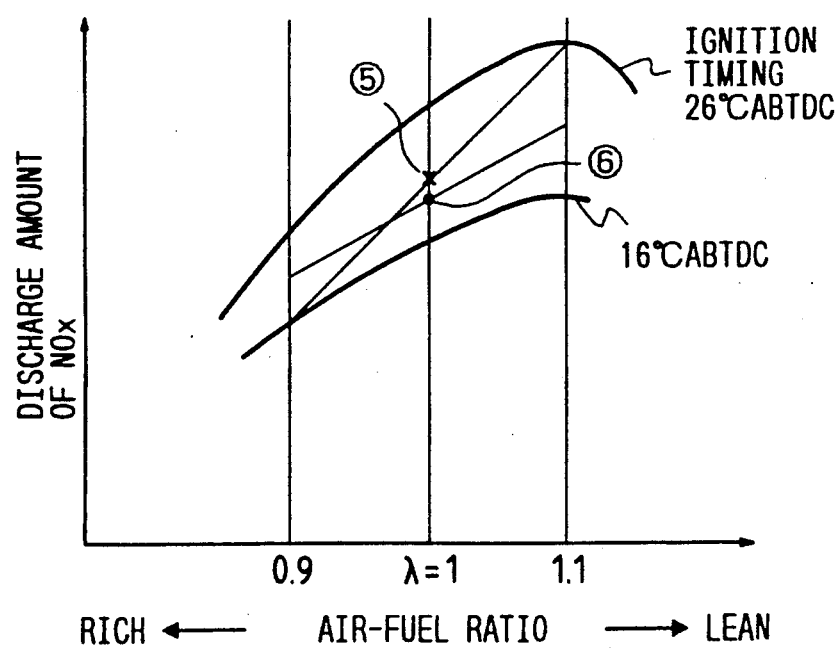
FIG. 11 is a graphic illustration for describing the relation between the retardation of the ignition timing and the discharge amount of NOx.

The states of the emissions in the case that the intermittent retardation period is set to be shorter than the injection period are shown in FIGS. 10 and 11. In FIG. 10, numeral 1 surrounded by a circle designates an HC discharge amount in the case of retardation, numeral 2 surrounded by a circle denotes an HC discharge amount in the case of no retardation, and numeral 3 surrounded by a circle represents the average value of HC discharge amounts in the case of being retarded when the air-fuel ratio is shifted to the rich side and not retarded when it is shifted to the lean side. This average value of the HC discharge amounts becomes greater than the average value (numeral 4 surrounded by a circle) of the discharge amounts in the case that the ignition timing is retarded and non-retarded while the air-fuel ratio is shifted to the rich and lean sides. That is, the HC discharge amount can be more reduced when the ignition timing retardation period is set to be shorter than the injection period.

Similarly, as illustrated in FIG. 11, in terms of NOx discharge amount, the average value (numeral 5 surrounded by a circle) of the NOx discharge amounts in the case that the ignition timing is retarded when the air-fuel ratio is shifted to the rich side and not retarded when the air-fuel ratio is shifted to the lean side becomes greater than the average value (numeral 6 surrounded by a circle) of the NOx discharge amounts in the case that the ignition timing is retarded and non-retarded while the air-fuel ratio is shifted to the rich and leans sides. That is, the NOx can be more reduced in the case that the ignition timing retardation period is set to be shorter than the injection period.

Secondly, a description will be made with reference to a flow chart of FIGS. 12 and 13 in terms of the injection control and the ignition timing control in the group injection system. Here, the outline of the group injection system is substantially similar to the arrangement illustrated in FIG. 1, and one difference therebetween is that the two injectors 16a and 16c simultaneously inject fuel at every 720° CA. and the remaining two injectors 16b and 16d simultaneously inject fuel at the timing shifted by 360° with respect to the two injectors 16a and 16c. The routine for calculating the injection dither coefficient KDIT and the intermittent retardation amount KRET is similar to that of FIG. 5. The injection dither coefficient KDIT and the intermittent retardation amount KRET are set to values (dither amount 10%, retardation amount 10° CA.) which are effective values in view of the catalyst warming-up and the emission improvement in the case that the water temperature THW is 20° C.

Figure 12:
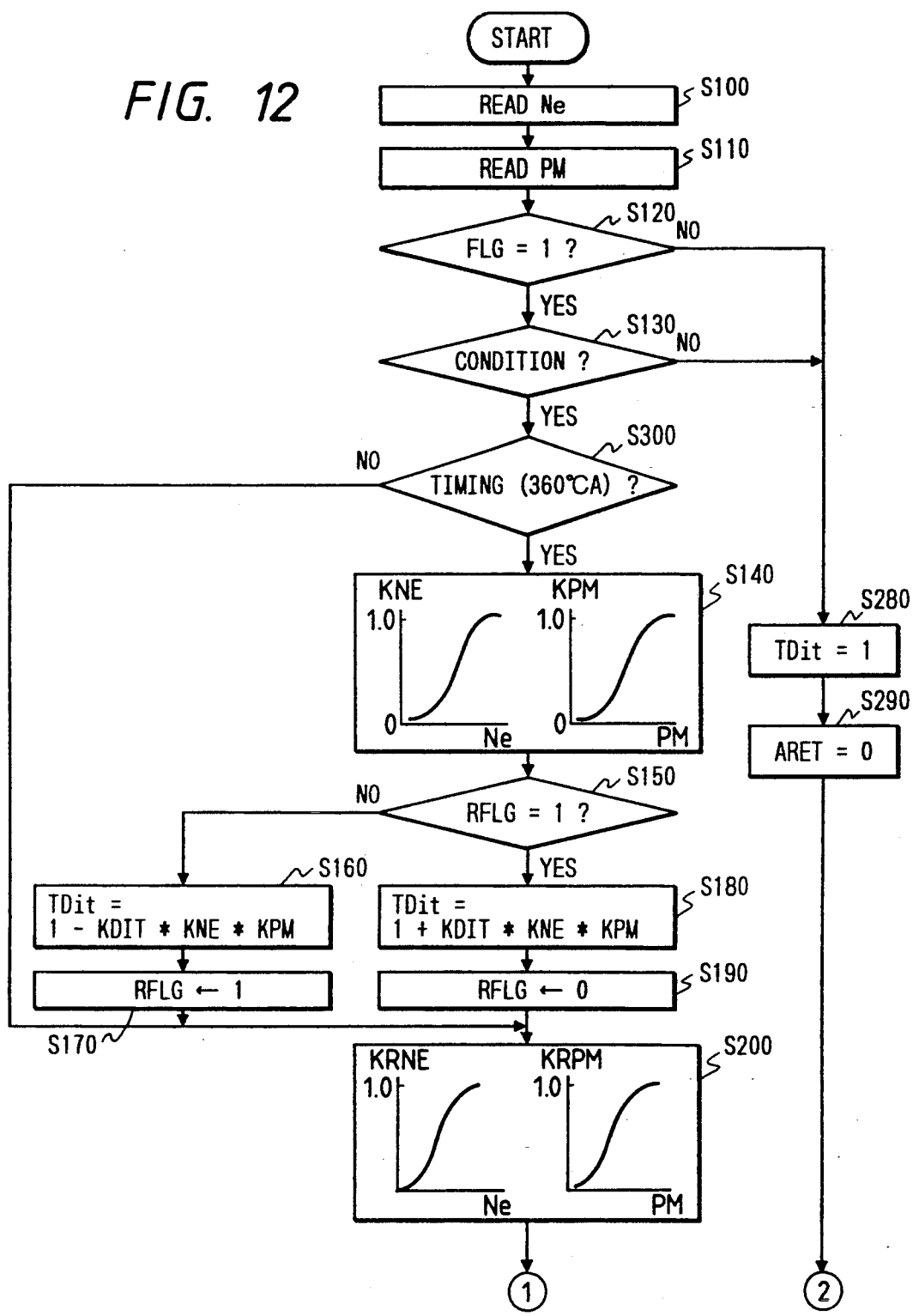
FIGS. 12 and 13 show a flow chart for describing the injection control and the ignition timing control of a group injection system in a third embodiment of this invention.
Figure 13:
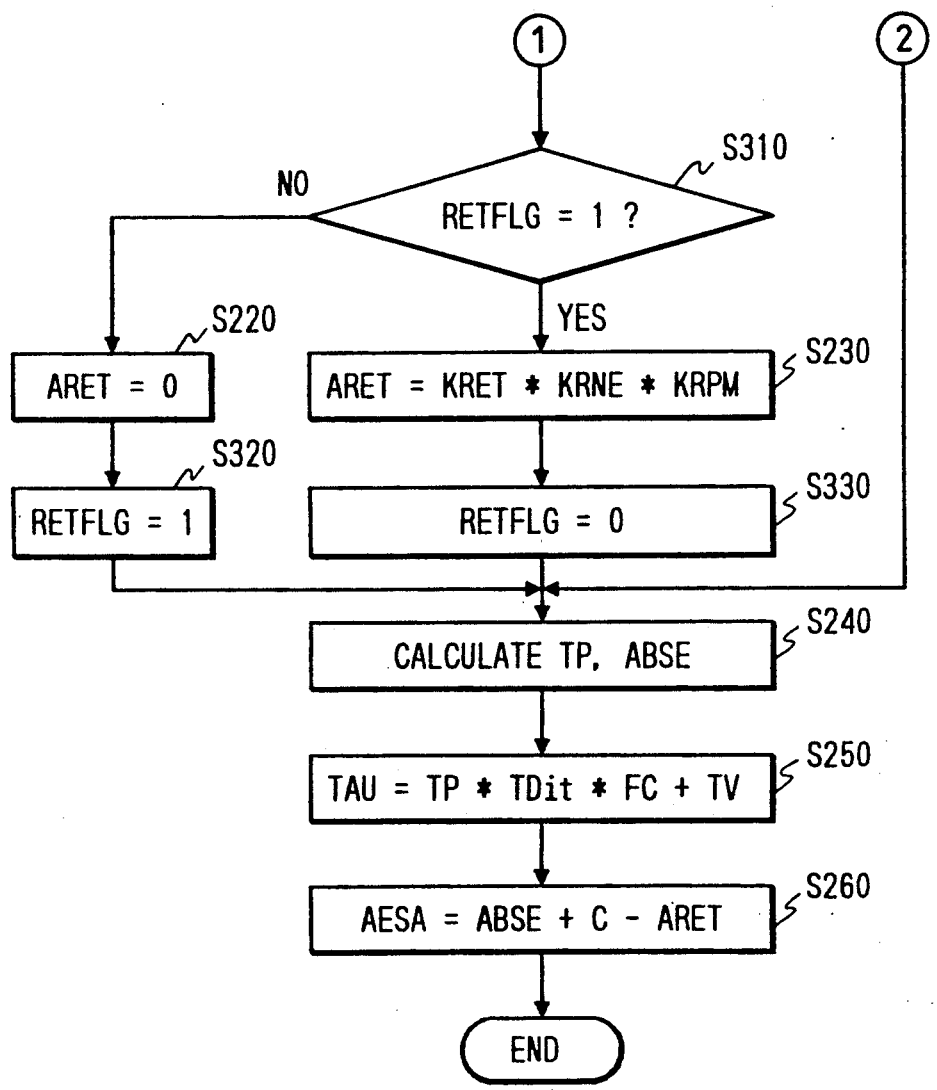

The routine shown in FIG. 12 is started and executed at every 180° CA. where parts corresponding to those in FIG. 6 are indicated by the same marks and the description thereof will be omitted. One difference point is that S300 is further added between S130 and S140. S300 is a step for checking whether now is the injection timing determined at every 360° CA. That is, S300 is a decision precess for effecting the injection dither process in the steps S140 to S190 at every 360° CA. In the routine of FIG. 13 subsequent to the FIG. 12 routine, S310 is executed in order to check whether an ignition timing decision flag RETFLG is in the set state. If being in the set state, the decision is made such that the retardation is not performed in the previous cycle and hence S230 follows to set the final retardation amount ARET, then followed by S330 to reset the flag RETFLG. On the other hand, if the decision of S310 is made such that the flag RETFLG is not in the set state; that is, in the case of retardation in the previous cycle, the final retardation amount ARET is set to 0 in S220, then followed by S320 to set the flag RETFLG, thereafter executing S240 to S260.

As described above, according to this embodiment, the air-fuel ratio is shifted to the rich and lean sides at every 360° CA. and the ignition timing is intermittently retarded at every 180° CA.

Figure 14:
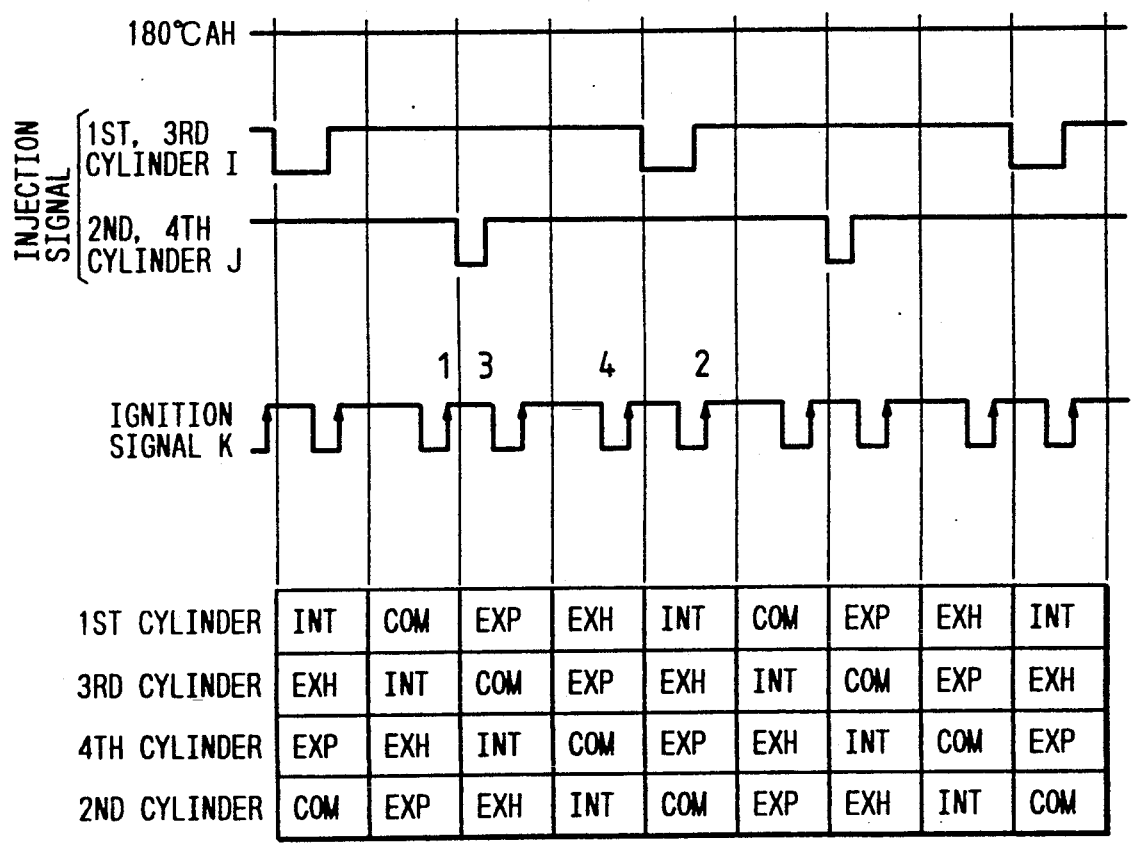
FIG. 14 is a timing chart showing injection signals and an ignition signal in the group injection system.

FIG. 14 is a timing chart for describing the output states of the injection signals and the ignition signal in the above-described group injection system. In FIG. 14, signals I and J are respectively injection signals for the first, third cylinders and the second, fourth cylinders. The signals I and J are respectively generated at every 720° CA. and shifted by 360° from each other. The injection signal is shifted to the rich and lean sides at every 360° CA. and as a result the rich signal is always outputted with respect to the first and third cylinders and the lean signal is always outputted with respect to the second and fourth cylinders. Further, the ignition signal is intermittently retarded at every 180° CA., i.e. every one ignition. More specifically, when the injection signal shifted to the rich side is outputted to the first and third cylinders, the first-cylinder ignition timing is retarded but the third-cylinder ignition timing is not retarded.

As described above, with the ignition retardation period being set to be shorter than the rich and lean period of the injection signal in the group injection system, it is possible to perform the control based on the retardation amount and the injection dither amount which allow great catalyst warming-up and emission improvement effects, and further to accelerate the suppression of the torque variation and the emission improvement. This embodiment is not limited to the group injection system but is applicable to a simultaneous injection system. The similar effect can be obtained.

Further, although in the above-described embodiments both the injection dither control and intermittent retardation control are executed, it is also possible to shorten the time period that the catalyst takes the full intake state even if executing the injection dither control only or the intermittent retardation control only, thus suppressing the deterioration of the emissions. In addition, in the case of executing the injection dither control only or the intermittent retardation control only, if limiting to an operating region such as a large-load region, a middle rotational speed region in which the affection of the torque variation due to the control is small, it is possible to prevent the deterioration of the driveability.

According to the above-described embodiments, when the warming-up of the catalyst is not completed, the engine alternately takes the rich combustion and the lean combustion so as to generate heat through the oxidative reaction of the carbon monoxide and oxygen produced thereby. The generated heat heats the catalyst which is in turn warmed up speedily so as to improve the emission purifying efficiency of the catalyst to thereby suppress the deterioration of the emissions. Moreover, since the ignition timing is intermittently retarded at the time of no completion of the warming-up of the catalyst, the warming-up of the catalyst can be accelerated so as to similarly suppress the deterioration of the emissions.

Figure 15:
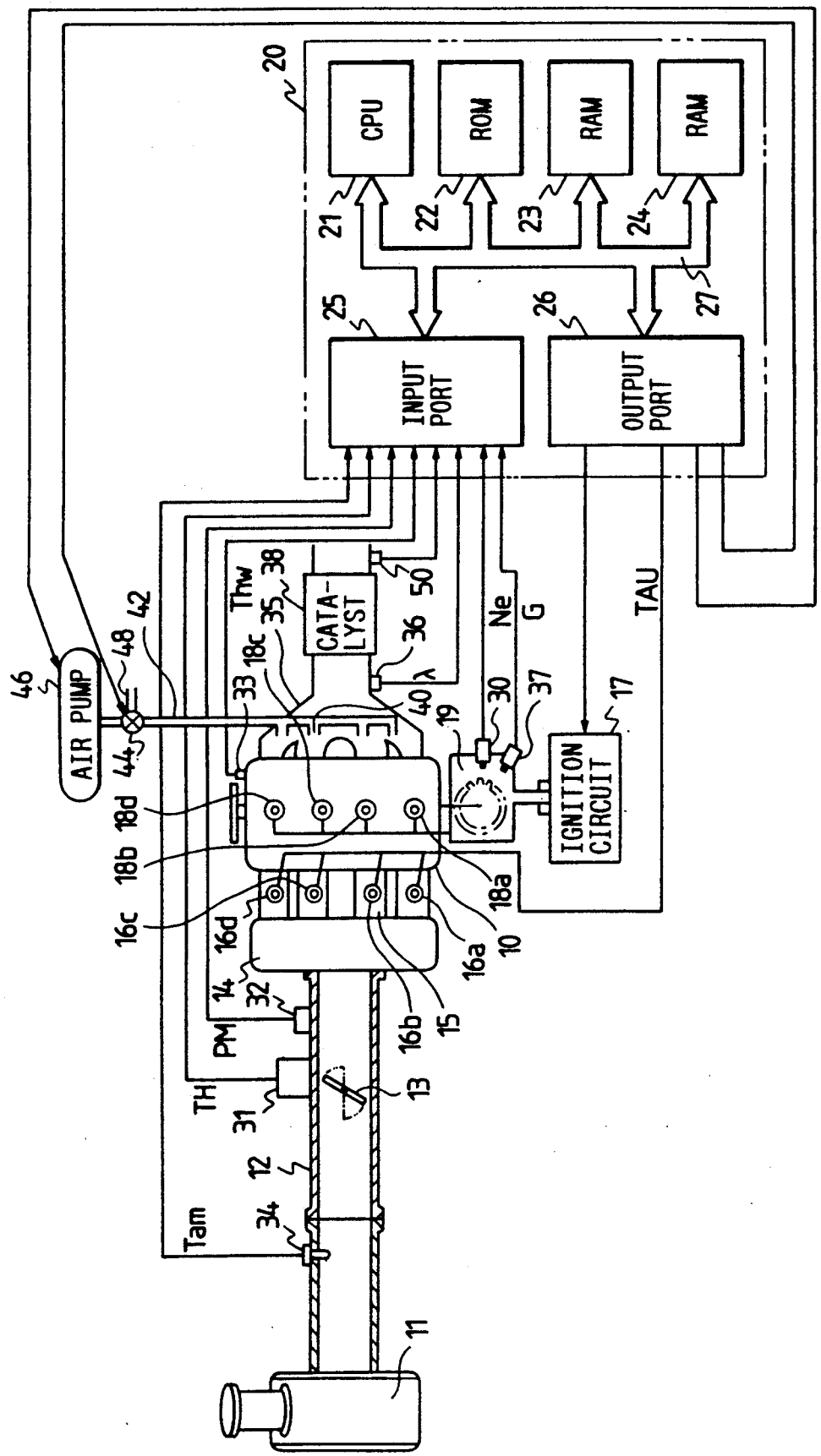
FIG. 15 is a block diagram showing an entire arrangement of a control apparatus according to a fourth embodiment of this invention.

Further, a description will be made hereinbelow in terms of a fourth embodiment of the present invention. FIG. 15 shows an entire arrangement of an engine control apparatus according to the fourth embodiment of this invention where parts corresponding to those in FIG. 1 are marked with the same numerals and characters and the description thereof will be omitted for brevity. In FIG. 15, designated at numeral 36 is an air-fuel ratio sensor 36 equipped with a heater (not shown) to quickly activate the air-fuel ratio sensor 36. At an upstream side of the air-fuel ratio sensor 36 there are formed secondary air intake openings 40 which are coupled through a pipe 42 to an air pump 46 which acts as a secondary air supply means. In a portion of the pipe 42 between the air intake openings 40 and the air pump 46 there is provided an electromagnetic type three-way directional control valve (which will be referred hereinafter to as a directional control valve) 44. The directional control valve 44 is connected to a relief pipe 48 whereby the secondary air can be introduced from the air pump 46 through the secondary air intake openings 40 into an exhaust pipe 35 in accordance with the switching control of the directional control valve 44 or the secondary air is directed toward the relief pipe 48 so as not to be introduced into the exhaust pipe 35.

Figure 16:
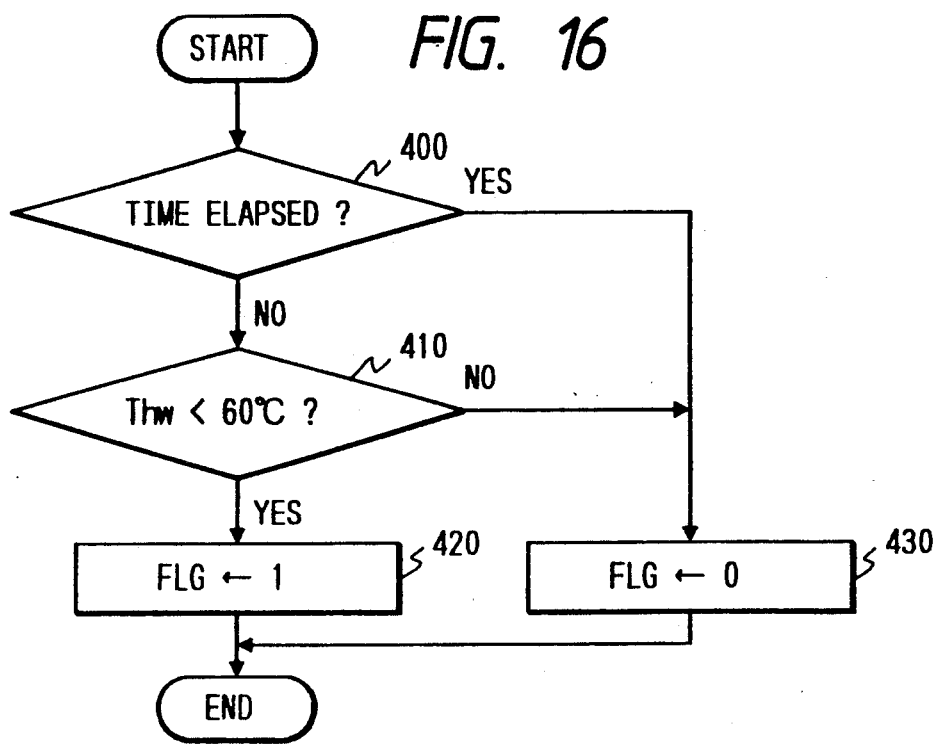
FIG. 16 is a flow chart showing a speedy catalyst warming-up decision operation in the fourth embodiment of this invention.

FIG. 16 is a flow chart showing an operation for determining whether the speedily warming-up processing for a catalytic converter rhodium 38 is effected or not. This routine is executed at a predetermined time interval (for example, 40 ms). In FIG. 16, a step 400 is first executed in order to check whether a predetermined time period is elapsed after the engine 10 completely starts (for example, Ne>500 rpm). This predetermined time period is a time required until the catalytic converter rhodium 38 reaches the temperature allowing the emission purification action, for example, set to 100 seconds. If the answer of the step 100 is affirmative, the operational flow goes to a step 430, and if the answer is negative, the operational flow goes to a step 410. The step 410 is for check whether the present cooling water temperature Thw read on the basis of the detection signal of a warming-up sensor 33 is below 60° C. (or in a range of 20° C. and 60° C.). If the cooling water temperature Thw is lower than 60° C., the operational flow advances to a step 420, and if being not lower than 60° C., the operational flow proceeds to the aforementioned step 430. In the step 420 a decision flag FLG indicative of the fact that the catalyst warming-up condition is satisfied is set to "1", thereafter terminating this routine. On the other hand, in the step 430 the decision is made such that the catalyst warming-up condition is not satisfied, and hence the decision flag FLG is cleared to be "0", thereafter terminating this routine.

Figure 17:
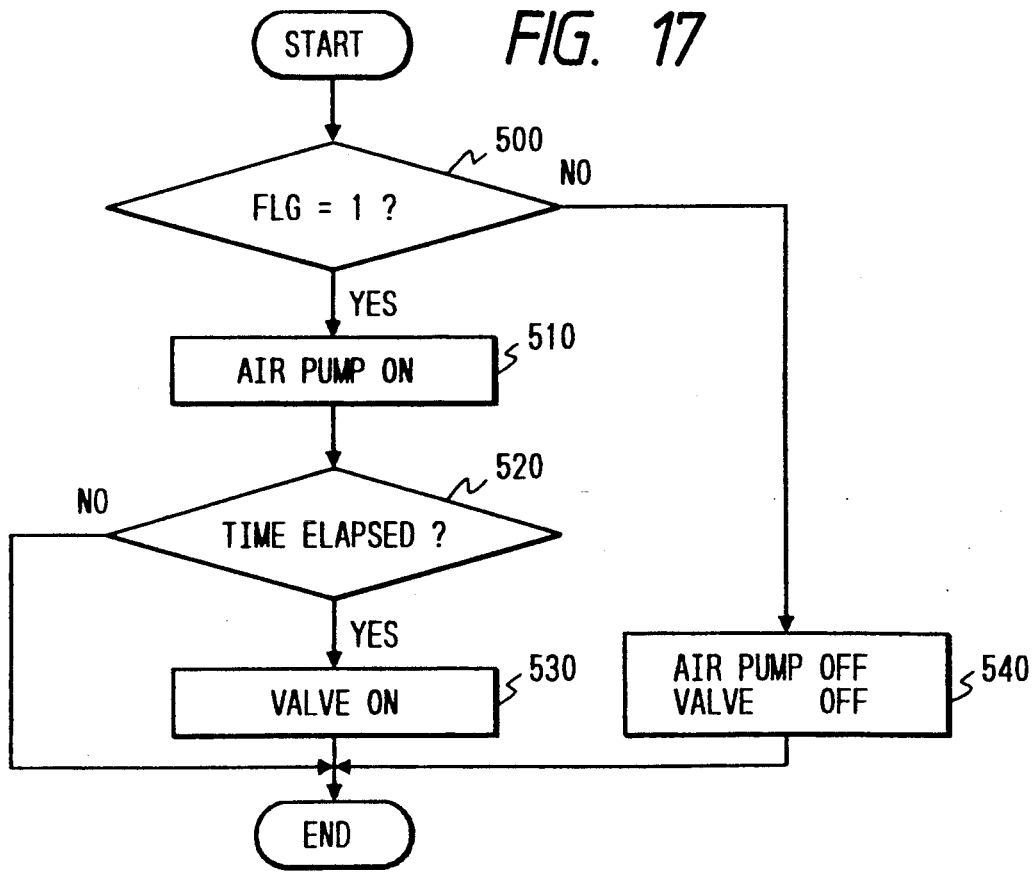
FIG. 17 is a flow chart showing operations of an air pump and a directional control valve in the fourth embodiment.

FIG. 17 is a flow chart showing the operation for controlling the air pump 46 and the directional control valve 44, which is also executed at a predetermined time interval (for example, 40 ms). In FIG. 17, a step 500 is for reading out the decision flag FLG set in the FIG. 16 operation so as to check whether the decision flag FLG is in the set state. If the flag FLG is in the set state, the control goes to a step 510 to output a control signal for operating the air pump 46. A step 520 follows to check whether a predetermined time period (for example, 1 second) is elapsed from the start of the air pump 46. If not elapsed, this routine terminates. If so, the control further advances to a step 530. This predetermined time period is a time required for stable supply of the secondary air quantity after the start of the operation of the air pump 46. The step 520 can prohibit the following processes until the elapse of the predetermined time period. In the step 530 a control signal is outputted to the directional control valve 44 whereby the directional control valve 44 is switched from the state that the air pump 46 is communicated with the relief pipe 48 to the state that the air pump 46 is communicated with the secondary air intake openings 40. Thus, the secondary air is supplied to the exhaust pipe 35. After the execution of the step 530, this routine terminates. On the other hand, if in the step 400 the decision flag FLG is not in the set state, the control goes to a step 540 to stop the air pump and output a control signal whereby the directional control valve 44 takes the state that the air pump 46 is communicated with the relief pipe 48. After the execution of the step 540, this routine terminates.

Figure 18:
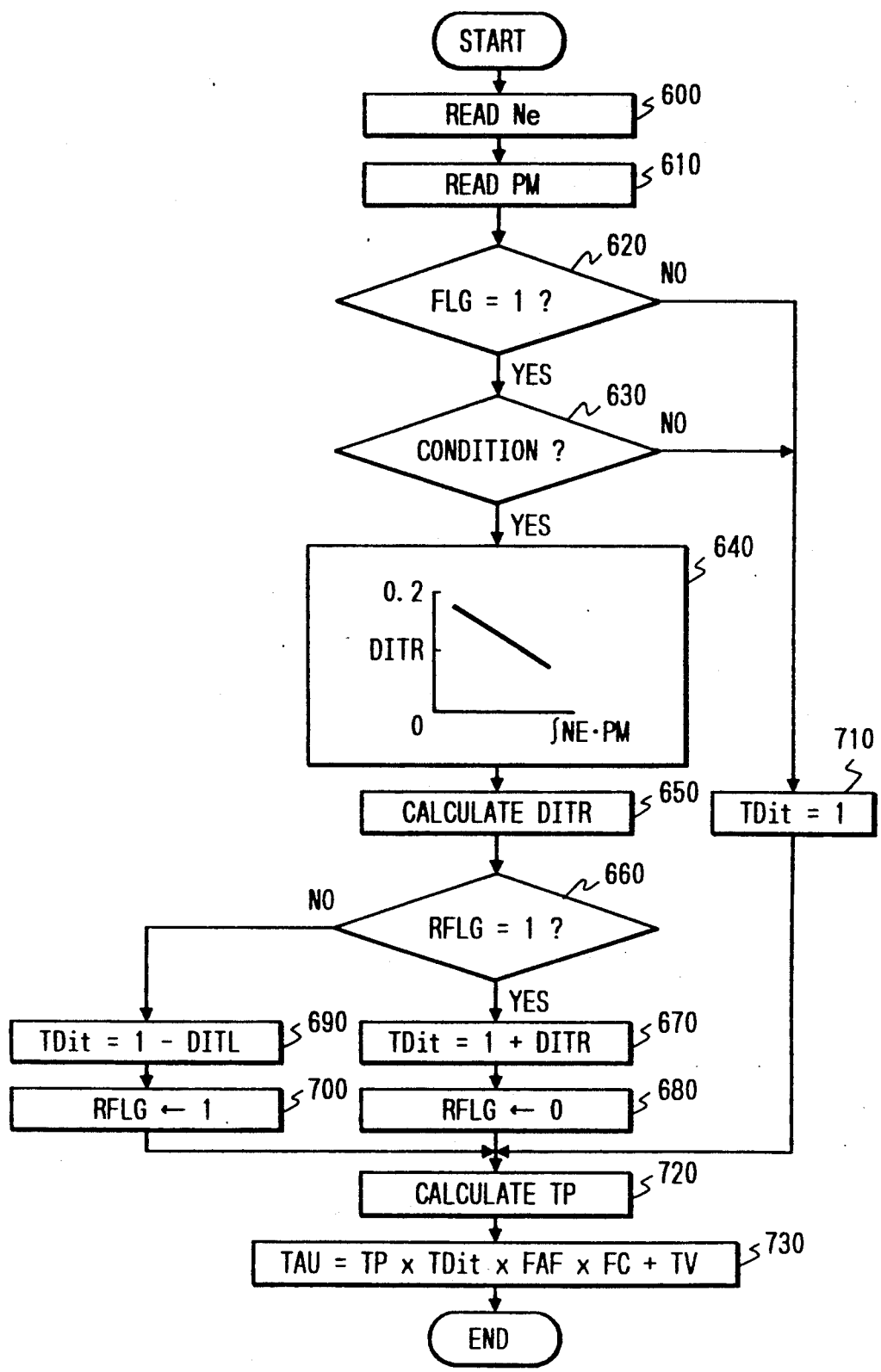
FIG. 18 is a flow chart showing an operation for calculation of a fuel injection quantity into an engine in the fourth embodiment.

FIG. 18 is a flow chart showing an operation for calculating the fuel injection quantity TAU to be supplied to the engine 10. This routine is executed at every 180° CA (top dead center in each cylinder). In FIG. 18, the operation starts with steps 600 and 610 to read the engine speed Ne and the intake pipe pressure PM, then followed by a step 620 to check whether the decision flag FLG is in the set state. If the decision flag is set, the operation advances to a step 630 to check whether a specific condition is satisfied. This specific condition means that the a predetermined time period (for example, 20 seconds) is elapsed from the start of the engine 10, the engine 10 is not in a high-load or high-rotation region where the fuel injection quantity is set to the rich side with respect to the theoretical air fuel ratio ($\lambda=1$), the engine 10 is not in a low-load or low-rotation region where the combustion is unstable, or the engine 10 is not in an accelerated state. If the answer of the step 630 is affirmative, the operation advances to steps 640 to 700 to perform the fuel injection quantity control process for warming up the catalyst. Here, the reason that the fuel injection quantity control process for the warming-up of the catalyst is not performed until the predetermined time period is elapsed from the start of the engine 10 is due to the fact that the air-fuel ratio sensor 36 is not activated sufficiently or the fuel injection quantity is set to the rich side because the combustion in the engine 10 becomes unstable at the time of the start of the engine 10.

In the step 640, there is calculated an injection quantity correction coefficient (rich dither coefficient) DITR for increasing the fuel injection quantity TAU to control the air fuel ratio to the rich side. Here, this rich dither coefficient DITR is determined in accordance with the intake air quantity determined on the basis of the engine speed Ne and the intake pipe pressure PM. More specifically, as the intake air quantity becomes greater, the rich dither coefficient DITR is set to be smaller. The map representing the relation between the rich dither coefficient and the intake air quantity as shown at the step 640 in FIG. 18 is prestored in the RAM 22. Here, a description will be made in terms of the reason that the rich dither coefficient DITR is set to be smaller as the intake air quantity becomes larger. In the case that the air fuel ratio is constant, the carbon monoxide (CO) density of the exhaust gas is always constant, while the exhaust gas quantity becomes larger as the intake air quantity becomes larger, thereby increasing the carbon monoxide (CO) density. Accordingly, as the intake air quantity is larger, the rich dither coefficient DITR is set to be smaller and the fuel injection quantity TAU is set to be smaller, whereby it is possible to always make constant the carbon monoxide (CO) density in the exhaust pipe 35 irrespective of the operating state of the engine 10. The step 650 is executed in order to obtain an injection quantity correction coefficient (lean dither coefficient) DITL for controlling the air fuel ratio to the lean side with the fuel injection quantity TAU being decreased. Here, in this embodiment, this lean dither coefficient DITL is predetermined to each internal combustion engine. More specifically, the lean dither coefficient DITL is set to the lean side limit value which can ensure the normal combustion of the engine 10. The step 660 is executed to check a dither confirmation flag RFLG indicative of whether the previous air fuel ratio is shifted to the rich side or the lean side. When the flag RFLG is in the setting state, that is, when the previous air fuel ratio is shifted to the lean side, the operation goes to the step 670 to set the present air fuel ratio to the rich side. In the step 670 the final dither coefficient TDit is calculated in accordance with the following equation.

$$TDit = 1 + DITR$$

After the calculation of the final dither coefficient TDit in the step 670, the operation advances to the step 680 to reset the flag RFLG to "0", thereafter proceeding to a step 720.

On the other hand, in the case that in the step 660 the flag RFLG is reset, that is, when the previous air fuel ratio is shifted to the rich side, the operation advances to the step 690 to set the present air fuel ratio to the lean side. In the step 690, the final dither coefficient TDit is calculated in accordance with the following equation.

$$TDit = 1 - DITL$$

After the calculation of the final dither coefficient TDit in the step 690, the operation advances to the step 700 to set the flag RFLG to "1", thereafter proceeding to the step 720.

On the other hand, if the answer of the step 620 is "NO", that is, when in the step 620 the decision flag FLG is not set, or if the answer of the step 630 is "NO", that is, when in the step 630 the specific condition is not satisfied, the operation goes to a step 710 to set the final dither coefficient TDit to 1, then followed by the step 720. As a result, under these conditions, the dither control is not effected, that is, the fuel injection quantity TAU is not shifted repeatedly to the rich side and the lean side.

In the step 720 the basic injection quantity TP, stored in a two-dimensional map of the engine speed Ne and the intake pipe pressure PM, is calculated on the basis of Ne and PM. After the execution of the step 720, a step 730 follows to set the final injection quantity TAU by multiplying the basic injection quantity TP by the final dither correction coefficient TDit, a basic injection quantity correction coefficient FC and an air fuel ratio correction coefficient FAF, and further adding an invalid injection time correction coefficient TV thereto as indicated by the following equation. After the execution of the step 730, this routine terminates.

$$TAU = TP \times TDit \times FAF \times FC + TV$$

Figure 19:
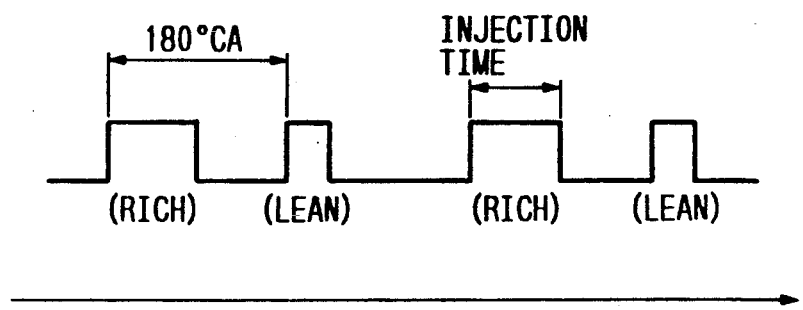
FIG. 19 is a timing chart for describing the fuel injection quantity calculating operation.

With the execution of the above-described processing, as illustrated in FIG. 19, the air fuel ratio is shifted to the rich side and the lean side at every combustion.

Here, the reason that the air fuel ratio is shifted to the rich side and the lean side at every combustion will be described hereinbelow. In internal combustion engines, the rich combustion can increase the carbon monoxide (CO) of the exhaust gas as described above, and on the other hand, the lean combustion can increase the oxygen ($O_2$) of the exhaust gas. That is, although in the prior art the oxygen ($O_2$) in the exhaust pipe 35 is increased by means of the air pump 46, the lean combustion in the engine can also increase the oxygen ($O_2$) in the exhaust pipe 35.

Figure 20:
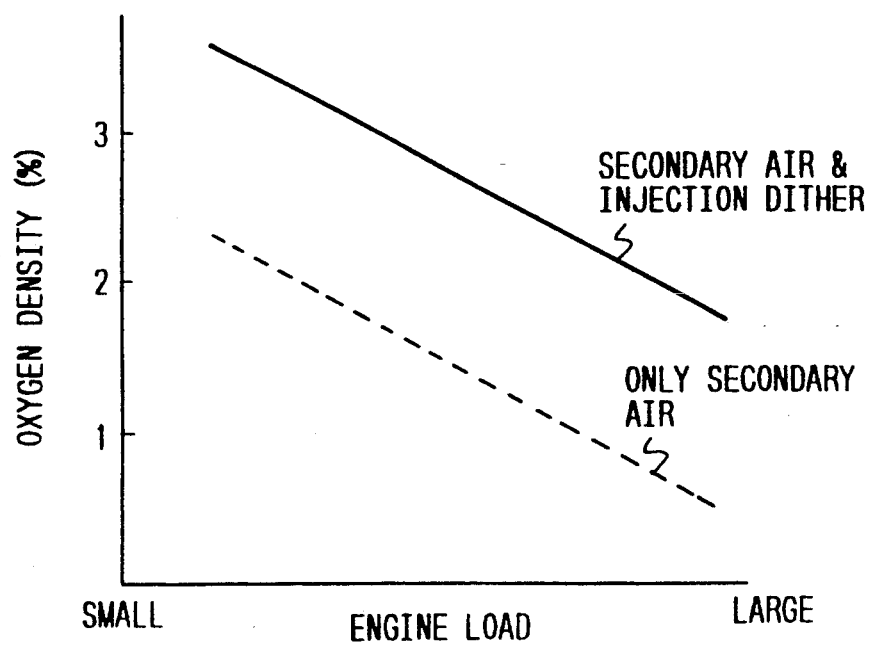
FIG. 20 is a characteristic illustration of the relation between the oxygen density and the engine load.

FIG. 20 is a graphic illustration in which the horizontal axis represents the engine load (for example, the intake pressure PM) and the vertical axis represents the oxygen ($O_2$) density in the exhaust pipe 35. Further, a dotted line shows a characteristic taken in the case that the oxygen ($O_2$) is supplied into the exhaust pipe 35 only by means of the air pump 46, and a solid line shows a characteristic taken in the case that the oxygen ($O_2$) is supplied into exhaust pipe 35 only by means of the same capacity air pump 46 and in addition the lean control (dither control) is executed with respect to the air fuel ratio. It is clear from these characteristics that the execution of the dither control allows the oxygen ($O_2$) density in the exhaust pipe 35 to increase. More specifically, according to tests by the inventors, for example, for effectively warming up the catalytic converter rhodium 38 in an internal combustion engine whose exhaust quantity is 1600 cc, in the case of using only the air pump 46, the secondary air of 120 liters is required to be supplied thereinto, while, in the case of executing the lean control of the air fuel ratio according to this embodiment, the secondary air is sufficient to be 60 liters per one minute only. Further, the reaction (oxidation reaction) between the carbon monoxide and oxygen thus produced generates a heat Q as indicated by the following equation, which heat Q heightens the exhaust gas temperature to accelerate the warming-up of the catalytic converter rhodium 38.

$$2CO + O_2 = 2CO_2 + Q$$

Thus, with the fuel injection quantity being decreased, the oxygen ($O_2$) of the exhaust gas increases whereby it is possible to reduce the secondary air quantity to be supplied for the oxidation reaction and hence it is possible to reduce the capacity of the air pump 46.

Figure 21:
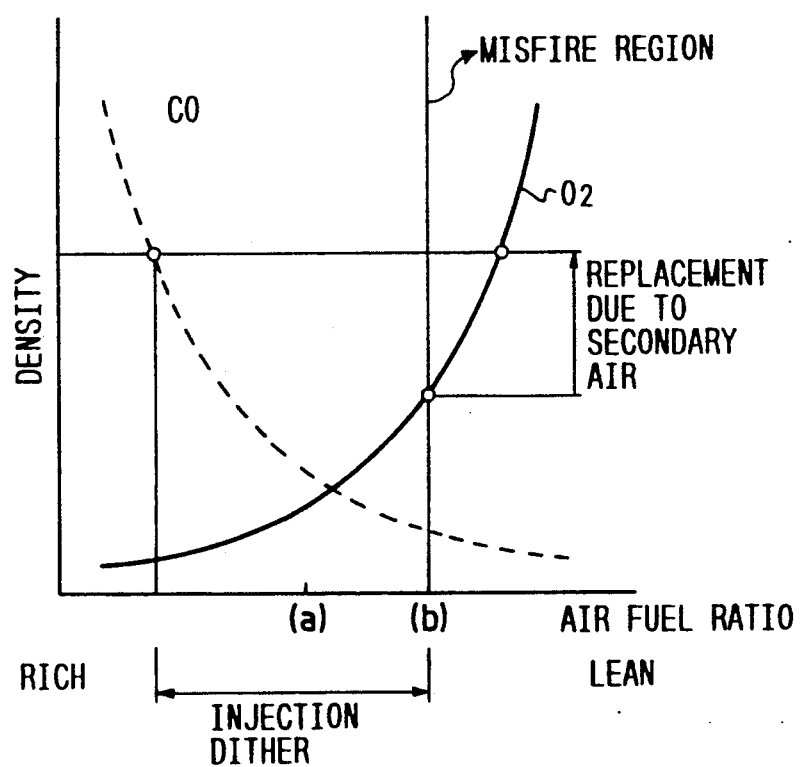
FIG. 21 is a characteristic illustration of the relation between the air fuel ratio, oxygen density and carbon monoxide.

Here, in the case of warming up the catalytic converter rhodium 38, when the mixture ratio at the catalytic converter rhodium 38 is controlled to the vicinity of the theoretical mixture ratio, it is possible to perform the warming-up of the catalytic converter rhodium 38 to obtain the greatest effect. That is, in the case that the mixture ratio at the catalytic converter rhodium 38 is at the rich side with respect to the theoretical mixture ratio, the oxygen ($O_2$) lacks to make it difficult to sufficiently effect the oxidation reaction (above-mentioned equation). On the other hand, in the case that the mixture ratio is at the lean side with respect thereto, excessive oxygen ($O_2$) generates so as to cool the catalytic converter rhodium 38. Thus, it is preferable that the fuel injection quantity TAU is controlled so that the mixture ratio takes the theoretical mixture ratio, thereby controlling the carbon monoxide (CO) quantity and the oxygen quantity ($CO_2$). However, as described above, in the case of the dither control, the air fuel ratio is controlled greatly to the rich side with respect to the theoretical air fuel ratio. In other words, although the fuel injection quantity TAU is greatly controllable to the increasing direction, since there is the possibility that misfire occurs in the engine, it is impossible to greatly control the air fuel ratio to the lean side with respect to the theoretical air fuel ratio. That is, as illustrated in FIG. 21, it is possible to easily increase the carbon monoxide of the exhaust gas, while difficulty is encountered to increase the oxygen ($O_2$) to become a density substantially equal to the density of the carbon monoxide (CO). Here, in FIG. 21, a solid line shows the oxygen ($O_2$) density and a dotted line shows the carbon monoxide (CO) density. Further, it is seen from this illustration that misfire occurs when the dither is greatly controlled to the lean side (exceeding a point indicated by (b) in FIG. 21) with respect to the theoretical air fuel ratio (indicated by (a) in FIG. 21), and hence the supply of the secondary air is required for causing the oxygen ($O_2$) to substantially become equal in density to the carbon monoxide (CO). Accordingly, in the case that, without using the air pump 46, the oxidation reaction is made by the carbon monoxide generated at the time of the rich combustion (CO) and the oxygen ($O_2$) generated at the time of the lean combustion, as a result difficulty is encountered to effectively effect the oxidation reaction because the oxygen ($O_2$) becomes smaller than the carbon monoxide (CO) due to the above-described reason. However, since in this embodiment the oxygen ($O_2$) lacked can be compensated by the air pump 46, it is possible to obtain a great reaction heat Q with the carbon monoxide (CO) being sufficiently increased by the rich combustion, thereby speedily warming up the catalyst. In addition, according to this embodiment, since the oxygen ($O_2$) quantity to be supplied by the air pump 46 is always constant and the oxygen ($O_2$) quantity generated at the time of the lean combustion can be obtained if the intake air quantity (the intake air pressure PM) is known, the carbon monoxide (CO) quantity can accurately set with the control of the fuel injection quantity TAU. Thus, it is possible to control the mixture ratio of the exhaust gas to the theoretical mixture ratio without controlling the secondary air quantity, thereby effectively warming up the catalytic converter rhodium 38 as described above. That is, according to this embodiment, it is possible to speedily warm up the catalyst, and since the the oxygen of the exhaust gas can be increased with the air fuel ratio in the engine being controlled to the lean side, it is possible to reduce the secondary air quantity and hence to reduce the capacity of the air pump.

Figure 22:
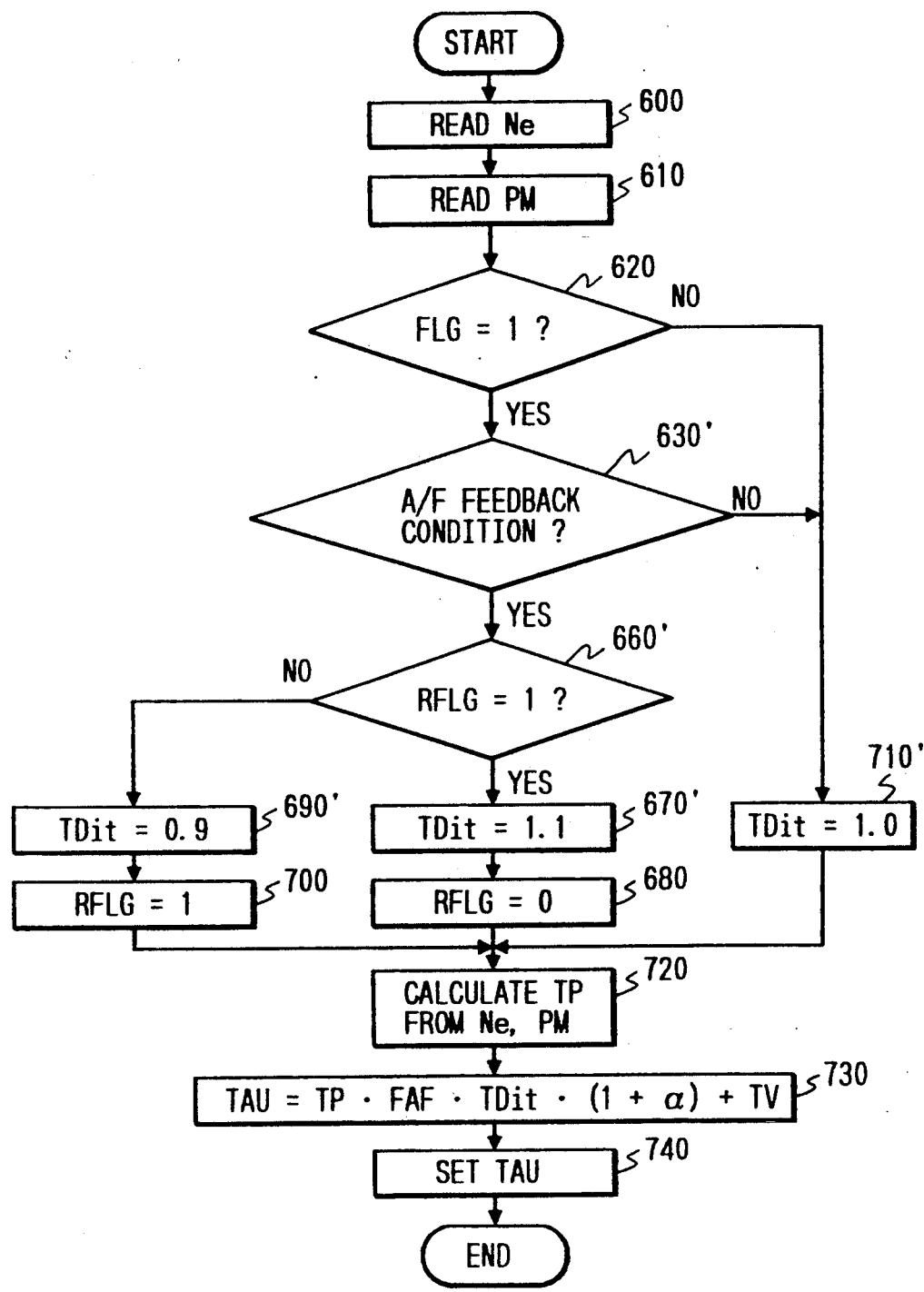
FIG. 22 is a flow chart showing an operation to be executed a control apparatus according to a fifth embodiment of this invention.

In addition, a description will be made hereinbelow in terms of a fifth embodiment of this invention. FIG. 22 is a flow chart showing an operation for calculating the final fuel injection quantity TAU where steps corresponding to those in FIG. 18 are marked with the same numerals and the detailed description will be omitted for brevity. In FIG. 22, steps 600 and 610 are first executed in order to read the engine speed Ne and the intake air pressure PM, and a step 620 is executed to check whether or not the decision flag FLG is set which is indicative of whether the injection dither condition (the catalyst warming-up condition) is satisfied or not (see FIG. 16). If the decision flag FLG is set to "1", the control goes to a step 630' to check whether an air fuel ratio feedback condition is satisfied or not. Here, the air fuel feedback condition means that the engine speed Ne is below a predetermined value Neo (Ne<Neo), the intake air pressure PM is below a predetermined value PMo (PM<PMo), the cooling water temperature Thw is above 20° C. (Thw>20° C.), or the engine 10 is not in an accelerated state. If satisfying the air fuel ratio feedback condition, a step 660' follows to check whether a dither confirmation flag RFLG is set (="1") which indicates whether the air-fuel ratio has been shifted to the rich side or lean side in the previous cycle. If the dither confirmation flag RFLG is set to "1", that is, when the previous air fuel ratio is shifted to the lean side, the control goes to a step 670' so as to set the air fuel ratio to the rich side in the present cycle. That is, the final dither coefficient TDit is set to 1.1. Then, the control advances to a step 680 to reset the dither confirmation flag RFLG to "0". On the other hand, if in the step 660' the dither confirmation flag RFLG is reset to "0", that is, when the previous air fuel ratio is shifted to the rich side, a step 690' is executed so as to set the present air fuel ratio to the lean side. That is, the final dither coefficient TDit is set to 0.9. Thereafter, the control advances to a step 700 to set the dither confirmation flag RFLG to "1". Here, in the case that in the step 620 the decision flag FLG is set to "0" or in the step 630' the air fuel ratio feedback condition is not satisfied, the control goes to a step 710' so as to set the final dither coefficient TDit to 1.0.

After the executions of the step 710', 680 or 700, the control proceeds to a step 720 to calculate the basic injection quantity TP on the basis of the engine speed Ne and the intake air pressure PM in accordance with a two-dimensional map previously stored, and further proceeds to a step 730 to calculate the final fuel injection quantity TAU on the basis of the basic injection quantity TP, an air fuel ratio correction coefficient FAF, the final dither coefficient TDit, a coefficient $\alpha$ and an invalid injection time TV in accordance with the following equation.

$$TAU = TP \cdot FAF \cdot TDit \cdot (1+\alpha) + TV$$

where the coefficient $\alpha$ is determined on the basis of the water temperature Thw, the engine speed Ne and the rate $\Delta$PM of change of the intake air pressure PM with the passage of time.

Further, after the calculation of the final fuel injection quantity TAU in the step 730, the control advances to a step 740 to set the calculated final fuel injection quantity TAU, thereafter terminating this routine.

Thus, the air fuel ratio is shifted to the rich side and the lean side at every combustion. As a result, it is possible to speedily warm up the catalyst so as to reduce the discharge of the hazardous components to the atmosphere.

Figure 23:
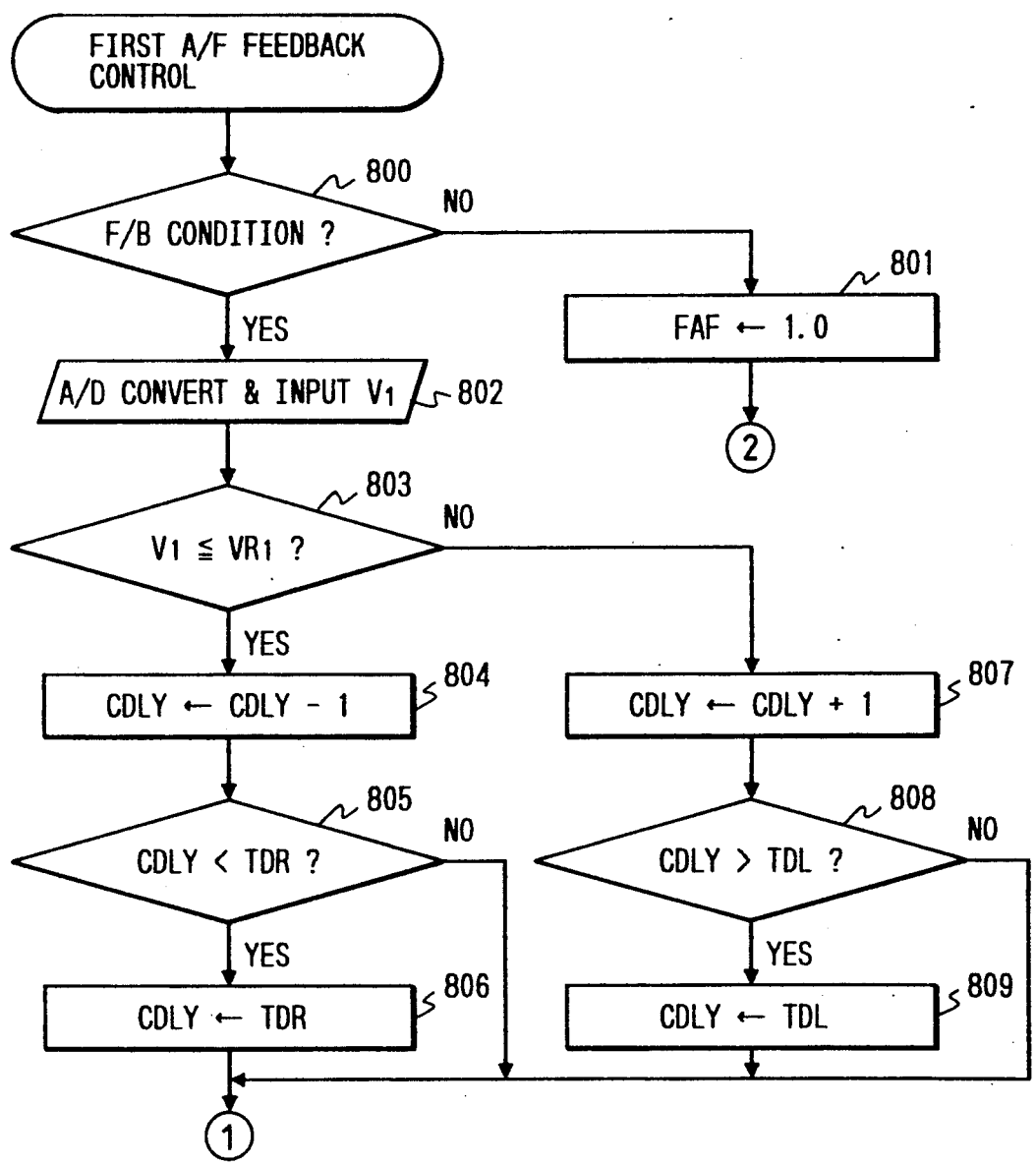
FIGS. 23 and 24 are flow charts for describing a first air fuel ratio feedback control in the fifth embodiment.
Figure 24:
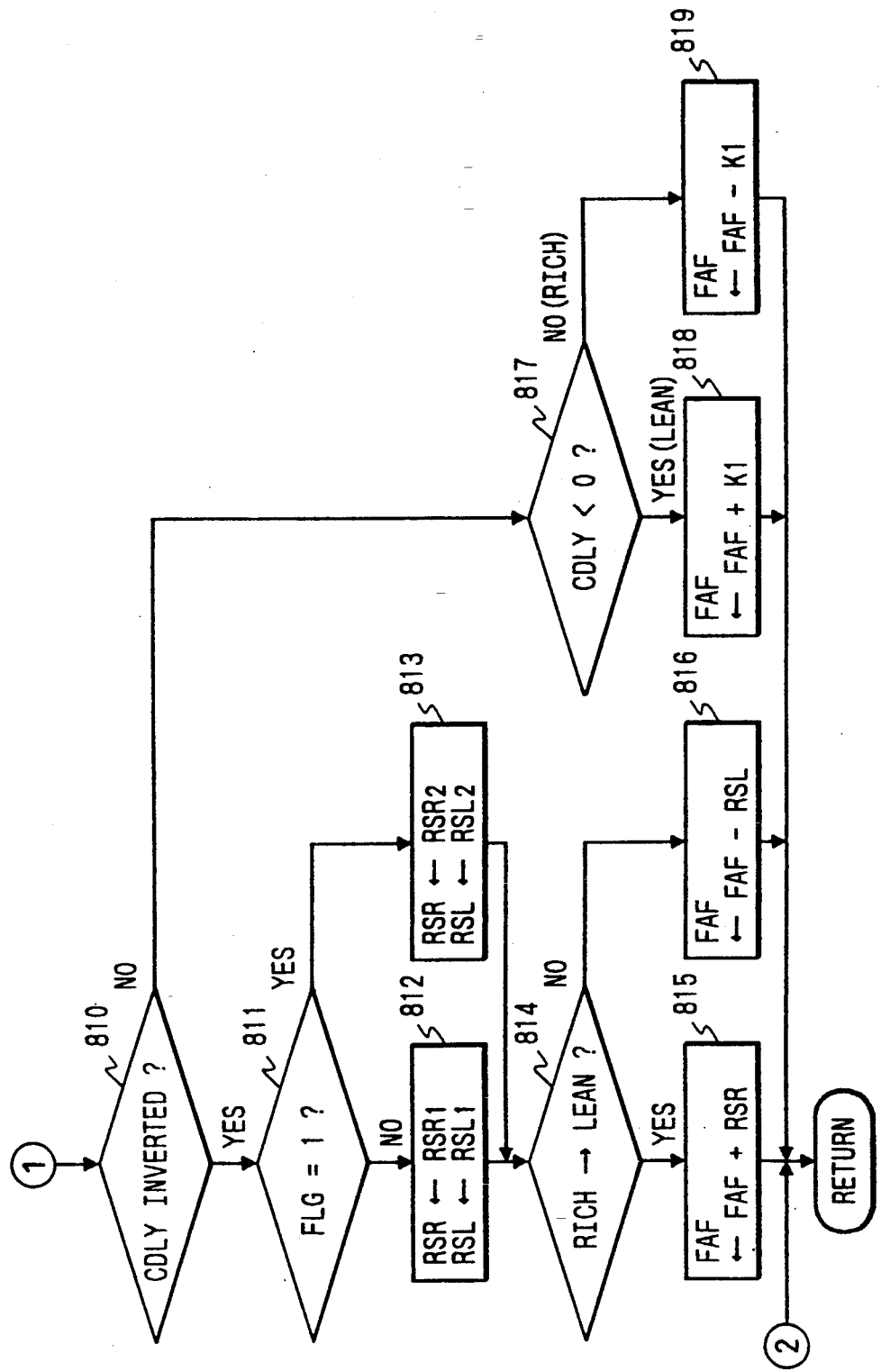

FIGS. 23 and 24 show a first air fuel ratio feedback control routine for calculating the air fuel ratio correction coefficient FAF on the basis of the output of the air ratio sensor 36 disposed at the upstream side of the catalytic converter rhodium 38. This routine is executed at a predetermined time interval (for example, 10 msec). This routine starts with a step 800 (corresponding to the step 630') to check whether the air fuel ratio feedback condition is satisfied. If not satisfying the condition, the operation goes to a step 801 to set the air fuel ratio correction coefficient FAF to 1.0. On the other hand, if satisfying the condition, the operation goes to a step 802 to analog-to-digital-convert and input the output V1 of the air fuel ratio sensor 36. In a step 803 the inputted air fuel ratio sensor 36 output V1 is compared with a comparison voltage VR1 (for example, 0.45 V), that is, it is check whether the output V1 is below the comparison voltage VR1. This is for checking whether the air fuel ratio is rich or lean. If the air fuel ratio is lean side, that is, when V1≦VR1, a step 804 follows to decrement the value CDLY of a delay counter by 1, then followed by steps 805 and 806 so as to guard the delay counter value CDLY by a minimum value TDR. That is, when the delay counter value CDLY is smaller than the minimum value TDR, the delay counter value CDLY is set to the minimum value TDR. Here, the minimum value TDR means a rich delay time for maintaining the decision that the air fuel ratio is at the lean side even if the output of the air fuel ratio sensor 36 changes from the lean state to the rich state. This minimum value TDR takes a negative value.

On the other hand, if in the step 803 the air fuel ratio is at the lean side, that is, when V1>VR1, a step 807 follows to increment the delay counter value CDLY by 1, then followed by steps 808 and 809 so as to guard the delay counter value CDLY by a maximum value TDL. Here, the maximum value TDL is a lean delay time for keeping the decision that the air fuel ratio is at the rich side even if the output of the air fuel ratio sensor 36 shows the variation from the rich state to the lean state. Here, the reference value of the delay counter is set to 0 so that the air fuel ratio after the delay process is considered to be rich when CDLY≧0 and considered to be lean when CDLY<0.

Figure 25:
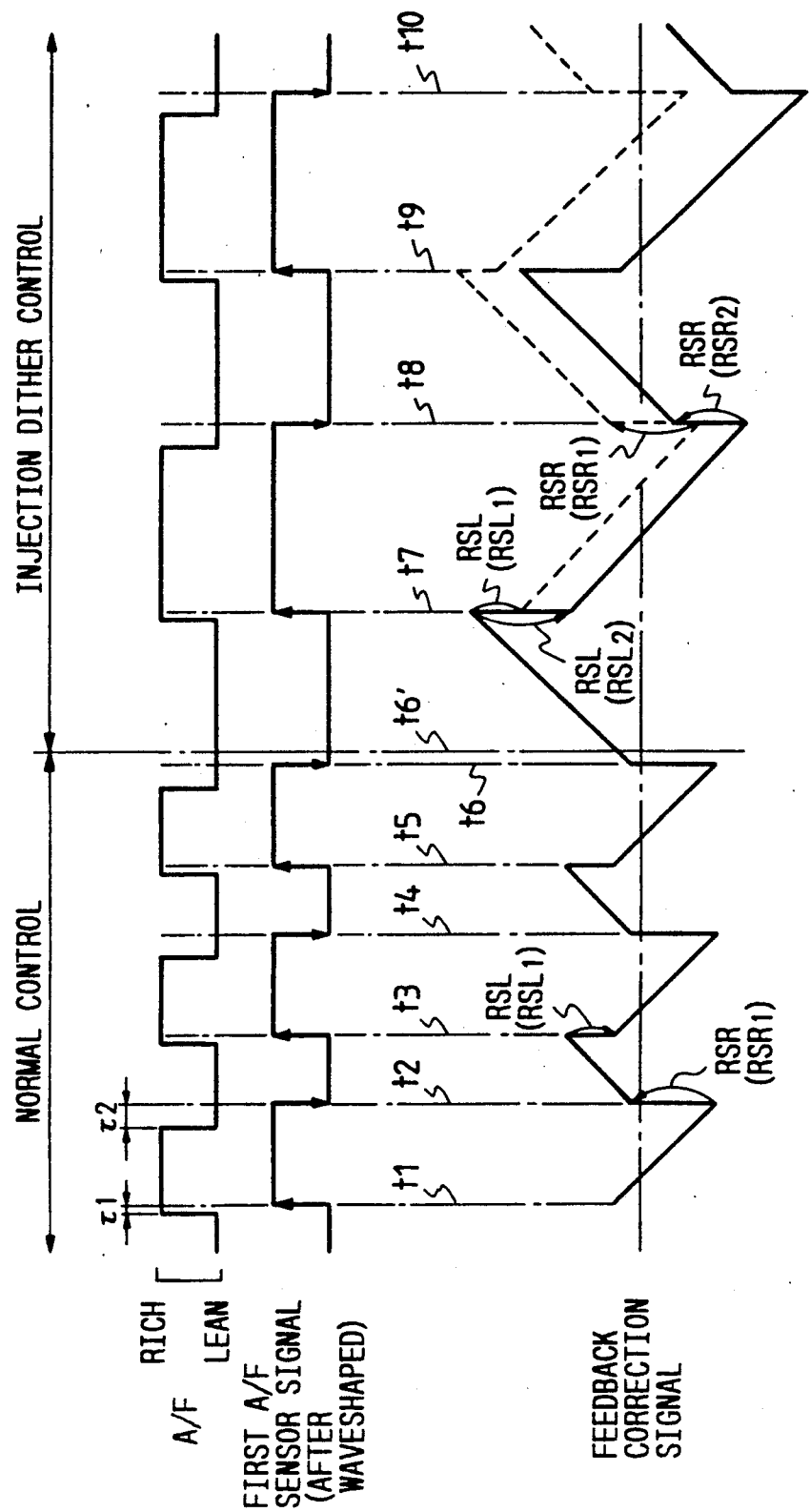
FIG. 25 is a timing chart for describing the operation in the control apparatus according to the fifth embodiment.

Further, the operation advances to a step 810 (FIG. 24) to check whether the sign of the delay counter value CDLY is inverted or not. That is, it is checked whether the state of the air fuel ratio after the delay process is inverted or not. If the air fuel ratio is inverted, a step 811 follows to check whether the decision flag FLG is "1". If FLG="0", a step 812 is executed to set a skip amount RSR to a predetermined value RSR1 and further set a skip amount RSL to a predetermined value RSL1. On the other hand, if in the step 811 the decision flag FLG is "1", a step 813 is executed to set the skip amount RSR to a predetermined value RSR2 and further set the skip amount RSL to a predetermined value RSL2. Then, the operation advances to a step 814 to check whether the air fuel ratio is inverted from the rich state to the lean state or from the lean state to the rich state. If the air fuel ratio is inverted from the rich state to the lean state, a step 815 follows to skippingly increase the air fuel ratio correction coefficient FAF so that FAF=-FAF+RSR, and if the air fuel ratio is inverted from the lean state to the rich state, a step 816 follows to skippingly decreases the air fuel ratio correction coefficient FAF so that FAF−RSL. That is, a skip process is effected at the timings t2, t3, t4, t5 and t6 as shown in FIG. 25 which is a timing chart for describing this operation. In FIG. 25, before the timing t6', the injection dither control is not performed, and after the timing t6', the injection dither control is effected. Further, in FIG. 25, the air fuel ratio sensor 36 delays by $\tau 1$ with respect to the actual air fuel ratio when being inverted from the lean state to the rich state, and delays by $\tau 2$ with respect thereto when being inverted from the rich state to the lean state.

Referring again to FIG. 24, if in the step 810 the sign of the delay counter value CDLY is not inverted, steps 817 and 818 or 819 follow in order to perform an integral process. That is, the step 817 is for checking whether CDLY<0. If CDLY<0 (lean), the step 818 is executed to set FAF=FAF+K1, and if CDLY≧0, the step 819 is executed to set FAF=FAF−K1 where K1 is an integral constant. Here, the integral constant K1 is set to be sufficiently smaller than a skip constant RS, that is, set to K1<<RS. Thus, in the step 818 the fuel injection quantity is gradually increased in the lean state (CDLY<0) (t2 to t3 and t4 to t5 in FIG. 25), and in the step 819 the fuel injection quantity is gradually decreased in the rich state (CDLY≧0) (t1 to t2, t3 to t4 and t5 to t6 in FIG. 25).

Here, the air fuel ratio correction coefficient FAF calculated in the step 815, 816, 818 or 819 is guarded by a minimum value (for example, 0.8) and a maximum value (for example, 1.2), that is, it is limited to a range of the minimum value and the maximum value. Accordingly, in case that the air fuel ratio correction coefficient FAF excessively increases or decreases by some cause, the air fuel ratio is controlled to be limited to the maximum value or the minimum value, thereby preventing an excessive rich or lean state. The air fuel ratio correction coefficient FAF thus calculated is stored in the RAM 23, thereafter terminating this routine.

Figure 26:
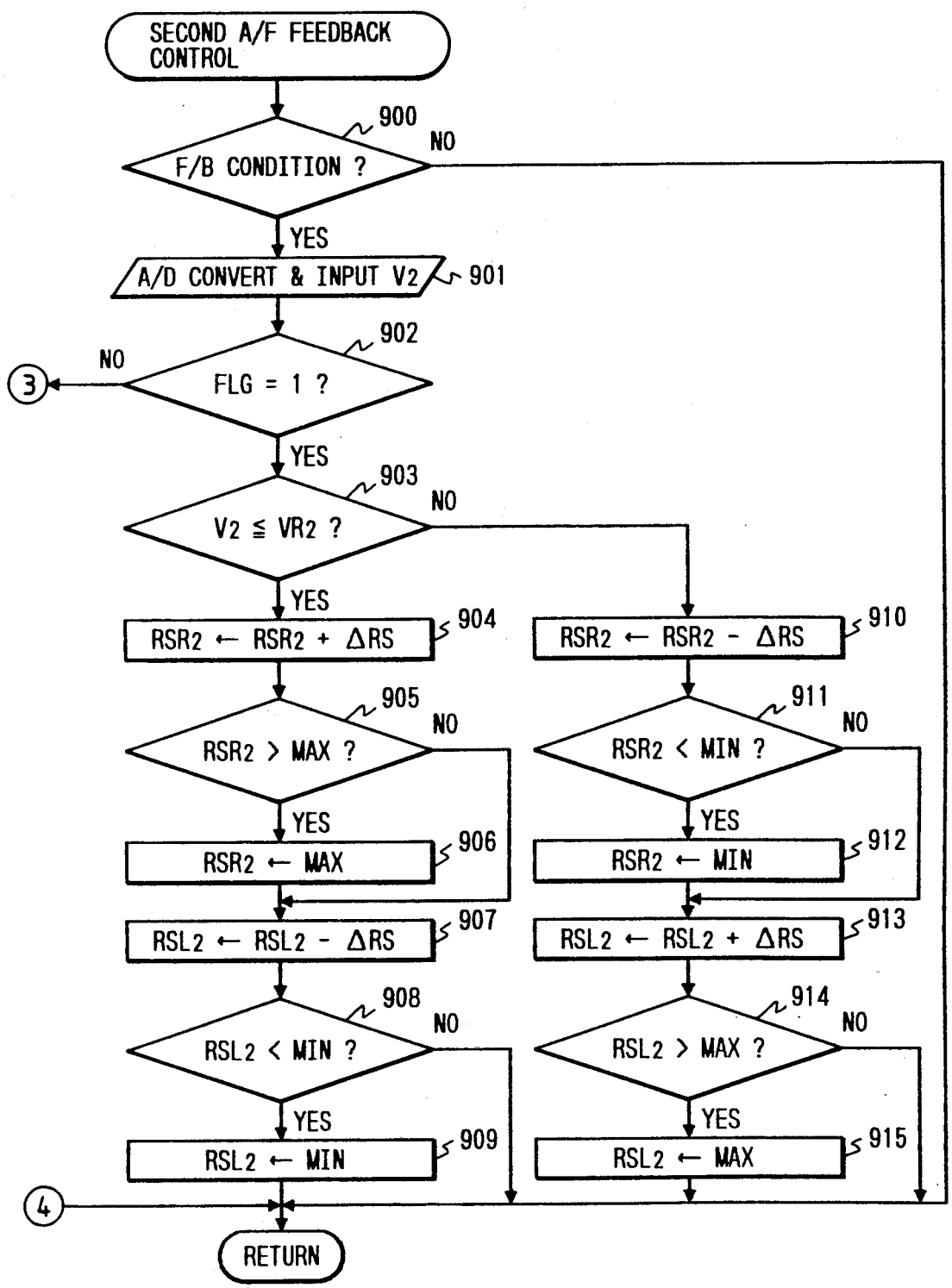
FIGS. 26 and 27 are flow charts for describing a second air fuel ratio feedback control in the fifth embodiment.
Figure 27:
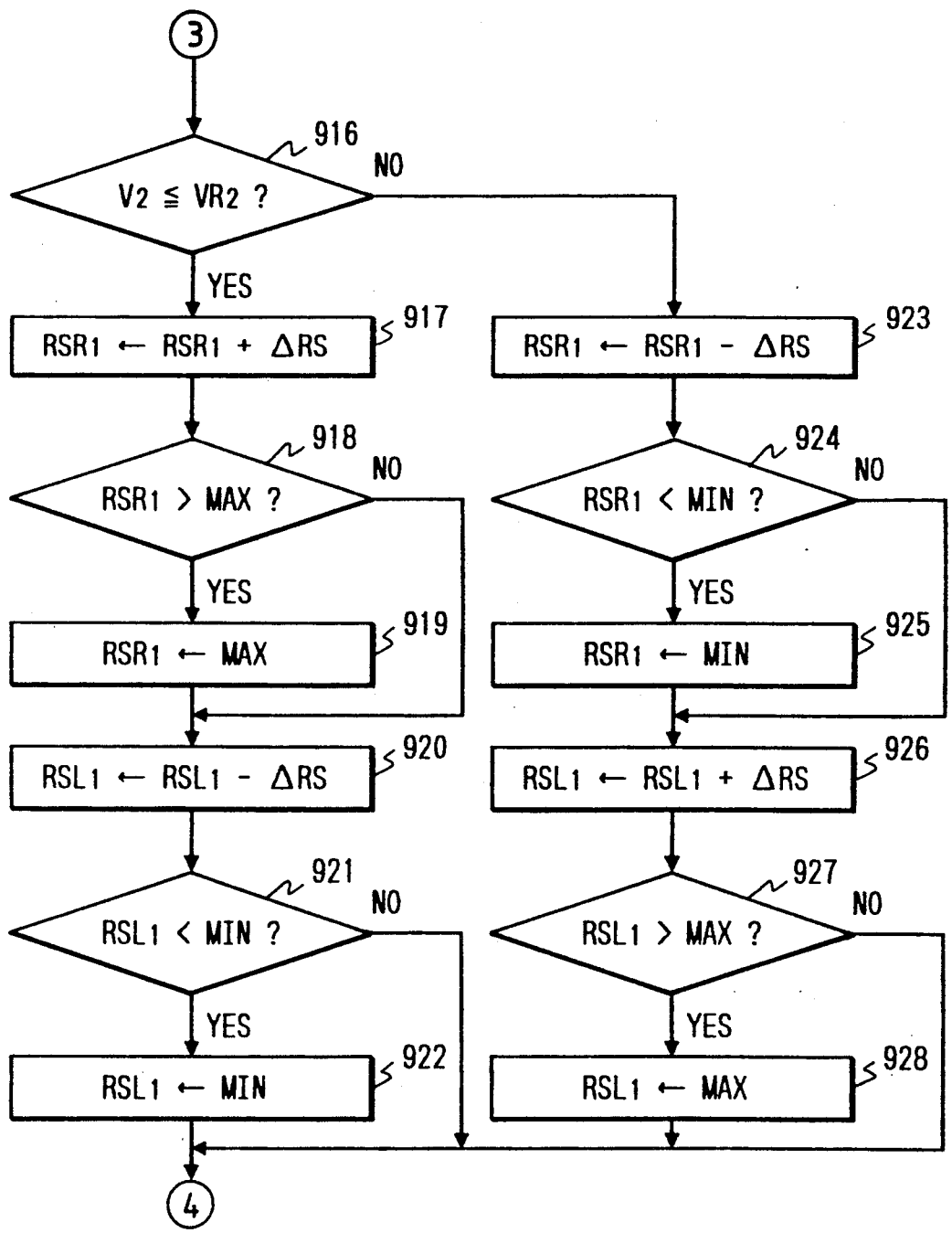

FIGS. 26 and 27 are flow charts showing a second air fuel ratio feedback control routine for calculating the skip amounts RSR and RSL on the basis of the output of a second air fuel ratio sensor 50 provided at a down stream side of the catalytic converter rhodium 38 as shown in FIG. 15. The second air fuel ratio sensor 50 is an $O_2$ sensor arranged to output a linear detection signal corresponding to the air fuel ratio λ of the mixture supplied to the engine 10. This second air fuel ratio feedback control routine is executed at a predetermined time interval (for example, 100 msec).

In FIGS. 26 and 27, the routine starts with a step 900 to check whether the feedback control condition of the air fuel ratio due to the second air fuel ratio sensor 50 (similar to the air fuel ratio feedback condition of the step. 630' in FIG. 22) is satisfied. If not satisfied, this routine terminates. On the other hand, if satisfied, the control goes to a step 901 to A/D-convert and inputs the output voltage V2 of the second air fuel ratio sensor 50, and then advances to a step 902 to check whether the decision flag FLG is "1". If FLG="0", the control goes to a step 916 to check whether the output voltage V2 of the second air fuel ratio sensor 50 is below a comparison voltage VR2 (for example, 0.55 V). That is, it is checked whether the air fuel ratio is rich or lean. Here, since the first-mentioned air fuel ratio sensor 36 and the second air fuel ratio sensor 50 are disposed such that the catalyst (38) is interposed therebetween, in consideration of the output characteristic affected by the raw gas and the output characteristic accompanied with the difference between the deterioration speeds, the comparison voltage VR2 is set to be higher than the first-mentioned comparison voltage VR1.

When in the step 916 the air fuel ratio is lean (V2≦VR2), a step 917 follows to set RSR1=RSR1+ΔRS (constant value). That is, the rich skip amount RSR is increased so that the air fuel ratio is shifted to the rich side. Steps 918 and 919 are for guarding the rich skip amount RSR by a maximum value MAX. Further, a step 920 follows to set RSL1=RSL−ΔRS (constant value). That is, the lean skip amount RSL is decreased so that the air fuel ratio is shifted to the rich side. Steps 921 and 922 are for guarding RSL1 by a minimum value MIN. On the other hand, if in the step 916 the air fuel ratio is rich (V2>VR2), a step 923 follows to set RSR1=RSR1−ΔRS (constant value). That is, the rich skip amount RSR is decreased so that the air fuel ratio is shifted to the lean side. Steps 924 and 925 for guarding RSR by the minimum value MIN. Further, a step 926 follows to set RSL1=RSL1+ΔRS (constant value). That is, the lean skip amount RSL is increased so that the air fuel ratio is shifted to the lean side. Steps 927 and 928 are for guarding RSL by the maximum value MAX.

On the other hand, if in the step 902 the decision flag FLG="1", the control goes to a step 903 to check whether the output voltage V2 of the second air fuel ratio sensor 50 is lower than a comparison voltage VR2 (for example, 0.55 V). That is, it is checked whether the air fuel ratio is rich or lean. If in the step 903 the air fuel ratio is lean (V2≦VR2), a step 904 follows to set RSR2=RSR2+ΔRS (constant value). That is, the rich skip amount RSR2 is increased so that the air fuel ratio is shifted to the rich side. Steps 905 and 906 are for guarding RSR2 by the maximum value MAX. Further, a step 907 follows to set RSL2=RSL2−ΔRS (constant value). That is, the lean skip amount RSL is decreased so that the air fuel ratio is shifted to the rich side. Steps 908 and 909 are for guarding RSL2 by the minimum value MIN. On the other hand, if in the step 903 the air fuel ratio is rich (V2>VR2), a step 910 follows to set RSR2=RSR2−ΔRS (constant value). That is, the rich skip amount RSR is decreased so that the air fuel ratio is shifted to the lean side. Steps 911 and 912 are for guarding RSR by the minimum value MIN. Further, a step 913 follows to set RSL2=RSL2+ΔRS. That is, the lean skip amount RSL is increased so that the air fuel ratio is shifted to the lean side. Steps 914 and 915 are for guarding RSL by the maximum value MAX.

After the RSR and RSL thus calculated are stored in the RAM 23, this routine terminates. Here, the minimum value MIN is a value corresponding to a level (for example, 3%) which does not deteriorate the transient follow-up characteristic, and the maximum value MAX is a value corresponding to a level (for example, 10%) which does not deteriorate the drivability due to the air fuel ratio variation.

As described above, according to the routine shown in FIGS. 26 and 27, when the output of the second air fuel ratio sensor 50 disposed at the downstream side of the catalytic converter rhodium 38 shows a lean state, the rich skip amount RSR is gradually increased and the lean skip amount RSL is gradually decreased, whereby the air fuel ratio is shifted to the rich side. On the other hand, when the output of the second air fuel ratio sensor 50 takes a rich side, the rich skip amount RSR is gradually decreased and the lean skip amount RSL is gradually increased, whereby the air fuel ratio is shifted to the lean side.

Here, in the case of no injection dither, the RSR1 and RSL1 are calculated in the steps 917, 920, 923 and 926 in FIG. 27, and in the case of the injection dither, the RSR2 and RSL2 are calculated in the steps 904, 907, 910 and 913 in FIG. 26. That is, two kinds of coefficients for the skip amounts are prepared and selected in accordance with the occurrence of the injection dither and no occurrence of the injection dither.

As described above, according to this embodiment, the electronic control unit (ECU) 20 controls the fuel injection valves 16a to 16d to inject the fuel by a quantity corresponding to the operating state of the engine 10, and further feedback-corrects the air fuel ratio by adjusting the fuel injection quantity so that the air fuel ratio is in a narrow range at the vicinity of the theoretical air fuel ratio. In addition, the ECU 20 changes the skip amount, which acts as the air fuel ratio feedback control constant, in accordance with the output of the second air fuel ratio sensor 50, disposed at the downstream side of the catalytic converter rhodium 38, so that the central air fuel ratio approaches the theoretical air fuel ratio. Moreover, in the state that the warming-up of the catalyst (38) is not yet completed, the ECU 20 performs the catalyst warming-up process by adjusting the fuel injection quantity so that the air fuel ratio is compulsorily shifted to the rich side and the lean side with respect to the theoretical air fuel ratio at a predetermined time interval. That is, with the rich combustion and the lean combustion being repeatedly effected, the carbon monoxide is arranged to generate at the time of the rich combustion and the oxygen is arranged to generate at the time of the lean combustion whereby the oxidative reaction between the carbon monoxide and the oxygen occurs to generate heat which in turn complete the warming-up of the catalyst. Further, when starting the catalyst warming-up process, the ECU 20 sets the first air fuel ratio feedback control constant (the initial value of the skip amount) for causing the central air fuel ratio to become the theoretical air fuel ratio, and when terminating the catalyst warming-up process, the ECU 20 sets the second air fuel ratio feedback control constant (the initial value of the skip amount) for causing the central air fuel ratio to become the theoretical air fuel ratio. That is, the first air fuel ratio feedback control constant (the initial value of the skip amount) set when switching from the state that the process is not performed to the state that the catalyst warming-up process is effected and the second air fuel ratio feedback control constant (the initial value of the skip amount) set when switching from the warming-up processing state to the non-processing state are prepared as different values, and with one of the air fuel ratio feedback control constants being selected in response to the switching, it is possible to cause the central air fuel ratio to quickly approach the theoretical air fuel ratio.

Here, although in this embodiment one of the different initial values of the skip amounts is taken in accordance with whether the dither control is executed or not, it is appropriate to select one of different integral values (integral constants K1 and K2) in accordance with the execution or no execution of the dither control.

Moreover, a description will be made hereinbelow in terms of a sixth embodiment of this invention. Although in the above-described fifth embodiment the initial value of the skip amount is determined in accordance with the execution or no execution of the dither control, in this embodiment a delay process is effected so that the sir fuel ratio is consider to be rich for a predetermined time period even if the output of the first-mentioned air fuel ratio sensor 36 disposed at the upstream side of the catalytic converter rhodium 38 shows the variation from the rich state to the lean state and considered to be lean for a predetermined time period even if the output of the first air fuel ratio sensor 36 shows the variation from the lean state to the rich state, and the above-mentioned delay processing time (delay time TD) is adjusted in accordance with the output of the second air fuel ratio sensor disposed at the downstream side of the catalytic converter rhodium 38. This embodiment also performs the operation illustrated in FIG. 22.

Figure 28:
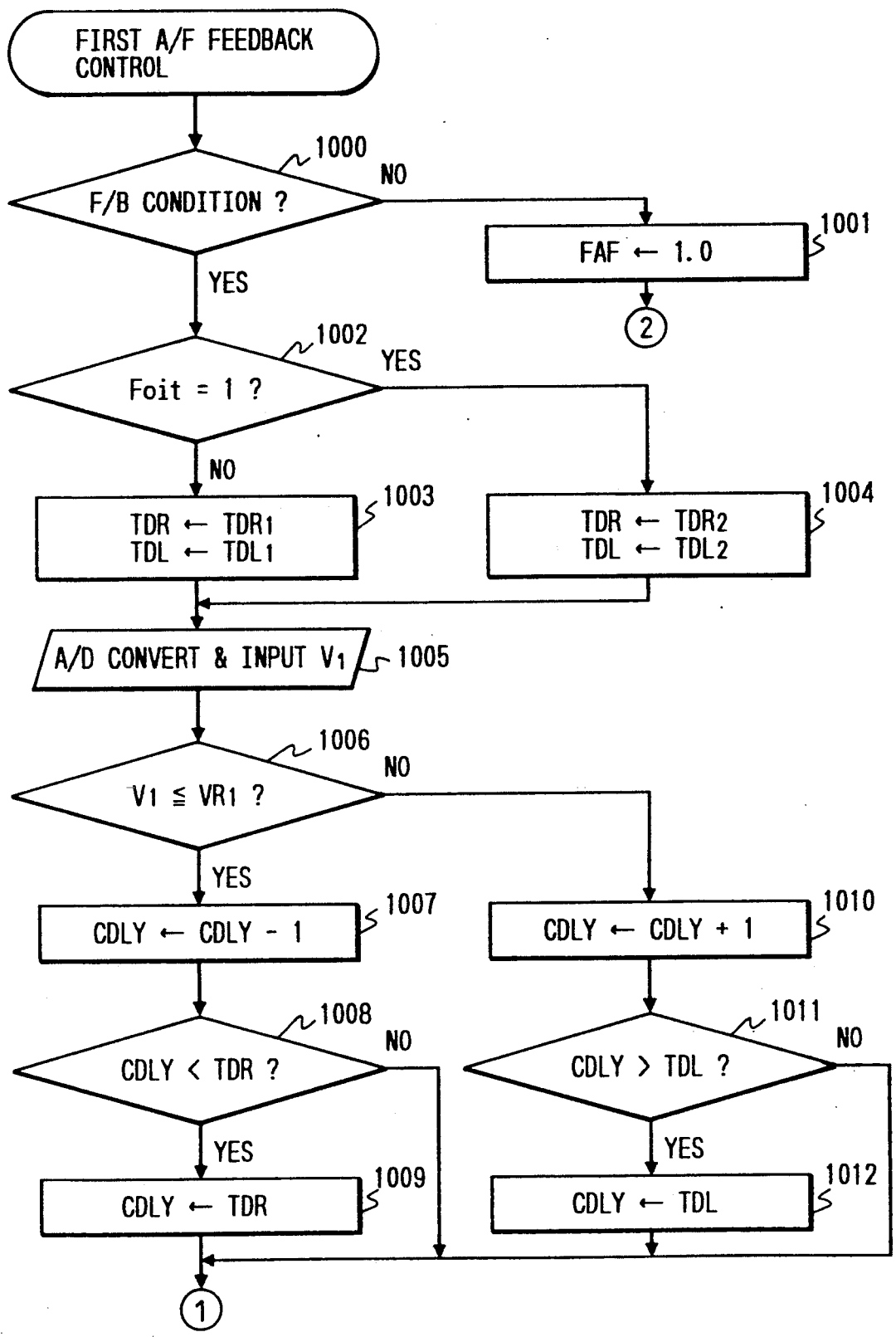
FIGS. 28 and 29 are flow charts showing a first air fuel ratio feedback control operation to be executed by a control apparatus according to a sixth embodiment of this invention.
Figure 29:
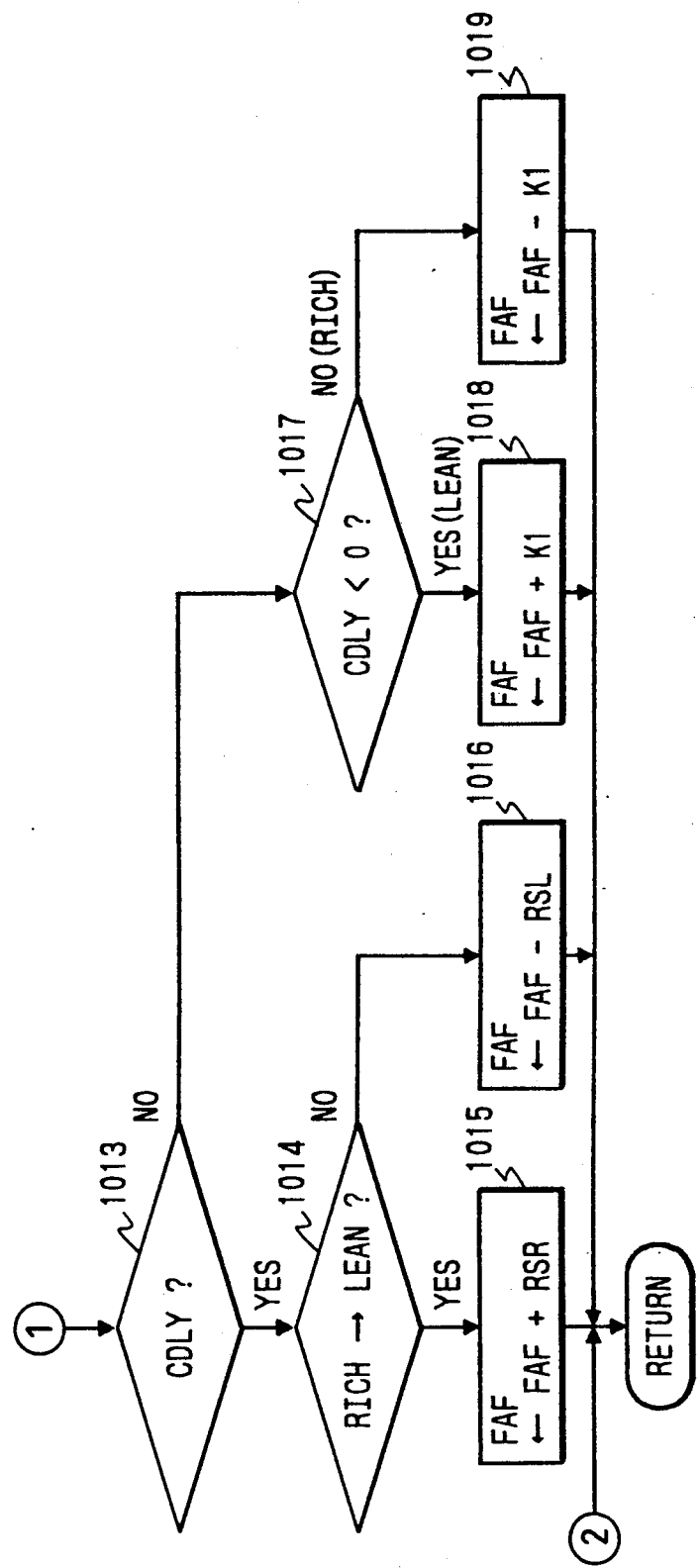

FIGS. 28 and 29 are flow charts showing a first air fuel ratio feedback control routine for calculating the air fuel ratio correction coefficient FAF on the basis of the output of the first air fuel ratio sensor 36. This routine is executed at a predetermined time interval (for example, 10 msec). In FIGS. 28 and 29, this routine starts with a step 1000 to check whether the air fuel ratio feedback control condition is satisfied which means that the engine speed Ne is blow a predetermined value Neo (Ne<Neo), the intake air pressure PM is below a predetermined value PMo (PM<PMo), and the water temperature Thw is above 20° C. (Thw<20° C.). If the feedback condition is not satisfied, the control goes to a step 1001 to set the air fuel ratio correction coefficient FAF to 1.0. On the other hand, if the feedback condition is satisfied, the control goes to a step 1002 to check whether the decision FLG is "1". If FLG="0", a step 1003 follows to set the delay time TDR to a predetermined value TDR1 and further set the delay time TDL to a predetermined value TDL1. If FLG="1" in the step 1002, a step 1004 follows to set the delay time TDR to a predetermined value TDR2 and further set the delay time TDL to a predetermined value TDL2. Then, a step 1005 is executed so as to A/D-convert and input the output V1 of the first air fuel ratio sensor 36 and a step 1006 is executed to the output V1 thereof is below a comparison voltage VR1 (for example, 0.45 V). That is, it is checked whether the air fuel ratio is rich or lean. If the air fuel ratio is lean (V1≦VR1), a step 1007 follows to decrement the a delay counter value CDLY by 1, then followed by steps 1008 and 1009 to guard the delay counter value CDLY by a minimum value TDR.

On the other hand, if in the step 1006 the air fuel ratio is rich (V1>VR1), a step 1010 is executed so as to increment the delay counter value by 1, then followed by steps 1011 and 1012 to guard the delay counter value CDLY by a maximum value TDL.

Thereafter, the control advances to a step 1013 to check whether the sign of the delay counter value CDLY is inverted or not. That is, it is checked whether the air fuel ratio after the delay process is inverted or not. If inverted, a step 1014 is executed to check whether the air fuel ratio is inverted from the rich state to the lean state or from the lean state to the rich state. If inverted from the rich state to the lean state, a step 1015 follows to skippingly increase FAF to become FAF=FAF+RSR, and if inverted from the lean state to the rich state, a step 1016 follows to skippingly decrease FAF to become FAF tp FAF−RSL. On the other hand, if in the step 1013 the sign of the delay counter value CDLY is not inverted, an integration process is effected in steps 1017, 1018 and 1019. That is, the step 1017 is executed for checking whether CDLY<0. If CDLY<0(lean), the step 1018 follows to set FAF=FAF +K1, and if CDLY≧0(rich), a step 1019 follows to set FAF=FAF−K1. Accordingly, in the step 1018 the fuel injection quantity is gradually increased in the lean state (CDLY<0), and in the step 1019 the fuel injection amount is gradually decreased in the rich state (CDLY≧0). After storing to the RAM 23 the FAF thus calculated, this routine terminates.

Figure 30:
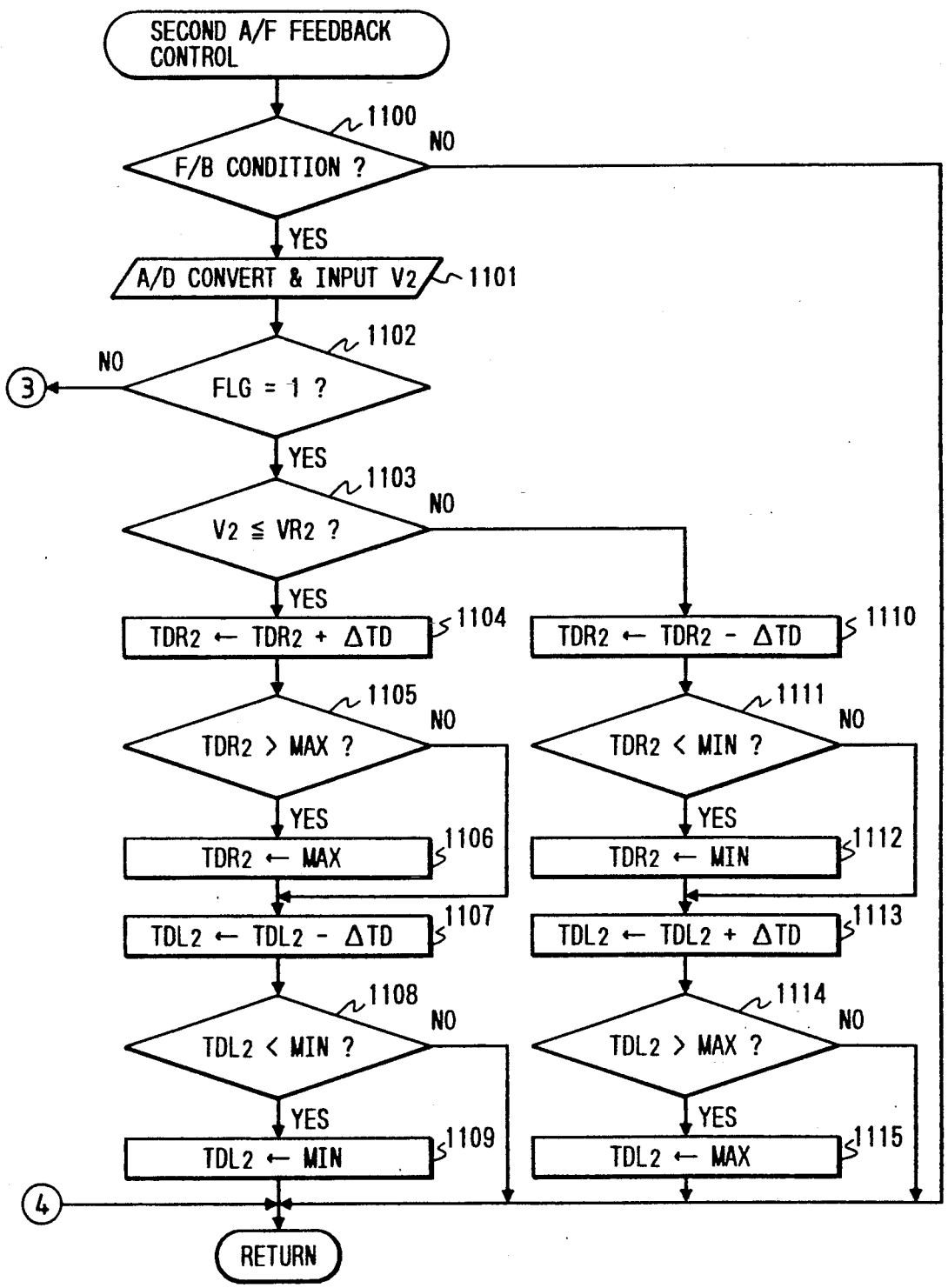
FIGS. 30 and 31 are flow charts showing a second air fuel ratio feedback control operation to be executed by the control apparatus according to the sixth embodiment.
Figure 31:
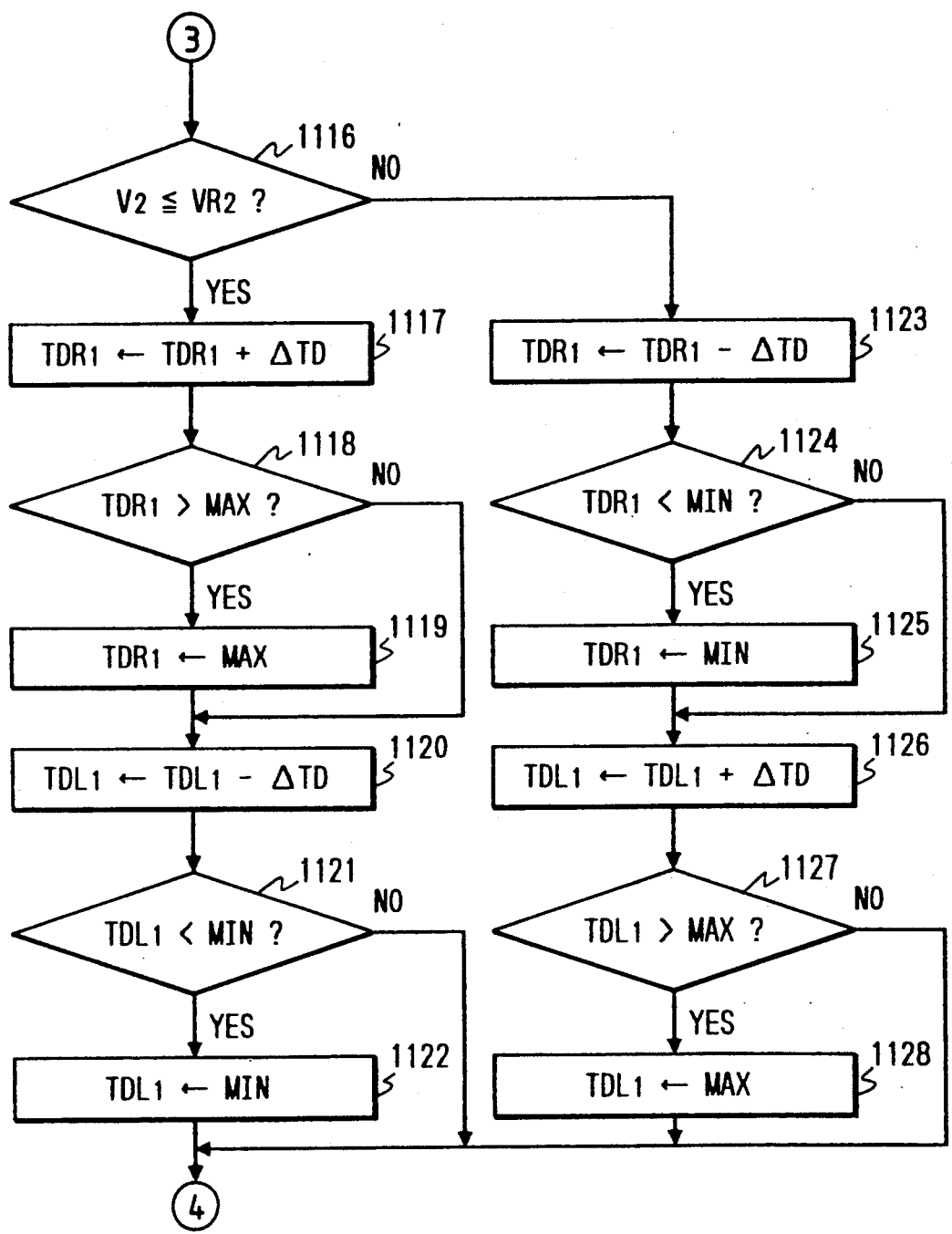

FIGS. 30 and 31 are flow charts showing a second air fuel ratio feedback control routine for calculating the delay times TDR and TDL on the basis of the output of the second air fuel ratio sensor 50. This routine is executed at a predetermined time interval (for example, 100 msec). In FIGS. 30 and 31, a step 1100 is first executed in order to check whether the air fuel ratio feedback control condition due to the output of the second air fuel ratio sensor 50 is satisfied or not. If not satisfied, this routine terminates. If satisfied, the control goes to a step 1101 to A/D-convert and input the output voltage V2 of the second air fuel ratio sensor 50, then followed by a step 1102 to check whether the decision flag FLG is "1". If FLG="0", the control jumps to a step 1116 in FIG. 31 to check whether the output voltage V2 of the second air fuel ratio sensor 50 is below a comparison voltage VR2 (for example, 0.55 V). That is, it is checked whether the air fuel ratio is rich or lean. If in the step 1116 the air fuel ratio is lean (V2≦VR2), a step 1117 follows to set TDR1=TDR1+ΔTD (constant value). That is, the rich delay time TDR is increased so that the air fuel ratio is shifted to the rich side. Steps 1118 and 1119 are for guarding the rich delay time TDR1 by a maximum value MAX. Further, a step 1120 follows to set TDL1=TDL1−ΔTD (constant value). That is, the lean delay time TDL is decreased so that the air fuel ratio is shifted to the rich side. Steps 1121 and 1122 are for guarding TDL1 by a minimum value MIN. On the other hand, if in the step 1116 the air fuel ratio is rich (V2>VR2), a step 1123 is executed to set TDR1=TDR1−ΔTD (constant value). That is, the rich delay time TDR is decreased so that the air fuel ratio is shifted to the lean side. Steps 1124 and 1125 are for guarding TDR by the minimum value MIN. Further, a step 1126 is executed to set TDL1=TDL1+ΔTD (constant value). That is, the lean delay time TDL is increased so that the air fuel ratio is shifted to the lean side. Steps 1127 and 1128 are for guarding TDL by the maximum value MAX.

Returning to FIG. 30, if in the step 1102 the decision flag FLG="1", a step 1103 is executed to check whether the output voltage V2 is below a comparison voltage VR2 (for example, 0.55 V). That is, it is checked whether the air fuel ratio is rich or lean. If in the step 1103 the air fuel ratio is lean (V2≦VR2), a step 1104 follows to set TDR2=TDR2+ΔTD (constant value). That is, the rich delay time TDR2 is increased so that the air fuel ratio is shifted to the rich side. Steps 1105 and 1106 are for guarding TDR2 by the maximum value MAX. Further, a step 1107 follows to set TDL2=TDL2−ΔTD (constant value). That is, the lean delay time TDL is decreased so that the air fuel ratio is shifted to the rich side. Steps 1108 and 1109 are for guarding TDL2 by the minimum value MIN. On the other hand, if in the step 1103 the air fuel ratio is rich (V2>VR2), a step 1110 follows to set TDR2=TDR2−ΔTD (constant value). That is, the rich delay time TDR is decreased so that the air fuel ratio is shifted to the lean side. Steps 1111 and 1112 are for guarding TDR by the minimum value MIN. In addition, a step 1113 is executed so as to set TDL2=TDL2+ΔTD (constant value). That is, the lean delay time TDL is increased so that the air fuel ratio is shifted to the lean side. Steps 1114 and 1115 are for guarding TDL by the maximum value MAX. After the calculation results of TDR and TDL are stored in the RAM 23, this routine terminates.

FIG. 32 is a timing chart showing the operation effected by the above-described sixth embodiment of this invention.

As described above, according to the routine illustrated in FIGS. 30 and 31, when the output of the second air fuel ratio sensor 50 is lean, the rich delay time TDR is gradually increased and the lean delay time TDL is gradually decreased, whereby the air fuel ratio is shifted to the rich side. On the other hand, when the output of the second air fuel ratio sensor 50 is rich, the rich delay time TDR is gradually decreased and the lean delay time TDL is gradually increased, whereby the air fuel ratio is shifted to the lean side.

In this embodiment, in the case of no injection dither operation, TDR1 and TDL1 are calculated in the steps 1117, 1121, 1123 and 1126 in FIG. 31, and in the case of the injection dither operation, TDR2 and TDL2 are calculated in the steps 1104, 1107, 1110 and 1113 in FIG. 30. That is, two kinds of coefficients for determining the delay time TD are prepared and one of them is selected in accordance with the execution or no execution of the injection dither.

According to this embodiment, the ECU 20 changes the delay time for the output decision of the first air fuel ratio sensor 36 in accordance with the output of the second air fuel ratio sensor 50 so that the central air fuel ratio approaches the theoretical air fuel ratio. Further, when starting the catalyst warming-up process, the ECU 20 sets a first delay time as the delay time for the output decision (rich/lean decision) of the first air fuel ratio sensor 36 so that the central air fuel ratio becomes the theoretical air fuel ratio, and when terminating the catalyst warming-up process, the ECU 20 sets a second delay time as the delay time for the output decision (rich/lean decision) of the first air fuel ratio sensor 20 so that the central air fuel ratio becomes the theoretical air fuel ratio. That is, the first delay time to be taken when performing the catalyst warming-up process after the state that the catalyst warming-up process is not performed and the second delay time to be taken when not performing the catalyst warming-up process after the catalyst warming-up processing state are prepared as different values, and in switching the state one of the different delay times is selected, whereby it is possible to cause the central air fuel ratio to approach the theoretical air fuel ratio. According to this invention, it is possible that the air fuel ratio quickly becomes the theoretical air fuel ratio at the time of the start or termination of the injection dither operation.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention. For example, although in the above-described embodiments the dither amount is constant, it is also appropriate that the dither amount is arranged to be variable and a correction coefficient is selected in accordance with the dither amount.

What is claimed is:

1. A control apparatus for an internal combustion engine having a catalyst provided in an exhaust pipe thereof for purifying emissions from said engine, comprising:

means for generating an operating parameter representing an operating condition of said engine;

means for determining when said catalyst is warming-up and outputting a temperature signal indicative thereof;

means for determining an amount of fuel provided to said engine based on said operating parameter; and means for correcting said fuel amount, in accordance with said temperature signal, to alternately provide to said engine, when said temperature signal indicates that said catalyst is warming-up, a rich amount of fuel to achieve a rich air-fuel ratio and a lean amount of fuel to achieve a lean air-fuel ratio.

2. A control apparatus for an internal combustion engine having a fuel injector and a catalyst provided in an exhaust pipe thereof for purifying emissions from said engine, comprising:

means for determining when said catalyst is warming up and outputting a temperature signal indicative thereof;

means for generating an operating parameter representing an operating condition of said engine;

first air fuel ratio sensor means, disposed in said exhaust pipe upstream of said catalyst with respect to flow of said emissions through said exhaust pipe, for detecting a first amount of a predetermined component of said emissions and outputting a first amount signal indicative thereof;

second air fuel ratio sensor means, disposed in said exhaust pipe downstream of said catalyst with respect to a flow of said emission through said exhaust pipe, for detecting a second amount of said predetermined component of said emissions and outputting a second amount signal indicative thereof;

means for controlling, based on said operating parameter, an amount of fuel provided to said engine by said fuel injector;

means for generating, in accordance with said second amount signal, a first air-fuel ratio constant when said temperature signal indicates that said catalyst warming-up and a second air-fuel ratio constant when said temperature signal indicates that said catalyst has completed warming up; and means for correcting said fuel amount, in accordance with said first amount signal and said first air-fuel ratio constant, to cause said controlling means to provide alternately to said engine, when said temperature signal indicates that said catalyst is warming up, a rich amount of fuel to achieve a rich air-fuel ratio and a lean amount of fuel to achieve a lean air fuel ratio with respect to a theoretical air-fuel ratio, and for correcting said fuel amount, in accordance with said first amount signal and said second air-fuel ratio constant, to cause said controlling means to provide alternately to said engine, when said temperature signal indicates that said catalyst has completed warming-up, a second rich amount of fuel to achieve a second rich air-fuel ratio and a second lean amount of fuel to achieve a second lean air fuel ratio.

3. A control apparatus for an internal combustion engine having a fuel injector and a catalyst provided in an exhaust pipe of said engine for purifying emission from said engine, comprising:

means for determining when said catalyst is warming up and outputting a temperature signal indicative thereof;

means for generating an operating parameter representing an operating condition of said engine;

first air fuel ratio sensor means, disposed in said exhaust pipe upstream of said catalyst with respect to a flow of said emissions through said exhaust pipe, for detecting a first amount of a predetermined component of said emissions and outputting a first amount signal indicative thereof;

second air fuel ratio sensor means, disposed in said exhaust pipe downstream of said catalyst with respect to a flow of said emissions through said exhaust pipe, for detecting a second amount of said predetermined component of said emissions and outputting a second amount signal indicative thereof;

means for controlling, based on said operating signal, an amount of said fuel injected into said engine by said fuel injector;

means for generating, in accordance with said second amount signal, a first time delay constant when said temperature signal indicates that said catalyst is warming up and a second time delay constant when said temperature signal indicates that said catalyst has completed warming up; and means for correcting said fuel amount, in accordance with said first amount signal and said first time delay constant, to cause said controlling means to provide alternately to said engine, when said temperature signal indicates that said catalyst is warming up, a rich amount of fuel to achieve a rich air-fuel ratio and a lean amount of fuel to achieve a lean air fuel ratio with respect to a theoretical air-fuel ratio, and for correcting said fuel amount, in accordance with said first amount signal and said second time delay constant, to cause said controlling means to provide alternately to said engine, when said temperature signal indicates that said catalyst has completed warming up, a rich amount of fuel to achieve a rich air-fuel ratio and a lean amount of fuel to achieve a lean air fuel ratio with respect to a theoretical air-fuel ratio.

4. An apparatus as claimed in claim 1, further comprising means for inhibiting, based on said operating parameter, said correcting means from correcting said fuel amount.

5. An apparatus a claimed in claim 4, wherein said inhibiting means inhibits said correcting means when said operating parameter indicates that said engine is operating at at least one of a predetermined load condition, a predetermined rotation condition and a predetermined accelerated condition.

6. An apparatus as claimed in claim 2, further comprising means for inhibiting, based on said operating parameter, said correcting means from correcting said fuel amount.

7. An apparatus a claimed in claim 6, wherein said inhibiting means inhibits said correcting means from correcting said fuel amount when said operating parameter indicates that said engine is operating at at least one of a predetermined load condition, a predetermined rotation condition and a predetermined accelerated condition.

8. An apparatus as claimed in claim 3, further comprising means for inhibiting, based on said operating parameter, said correcting means from correcting said fuel amount.

9. An apparatus a claimed in claim 8, wherein said inhibiting means inhibits said correcting means from correcting said fuel amount when said operating parameter indicates that said engine is operating at at least one of a predetermined load condition, a predetermined rotation condition and a predetermined accelerated condition.

10. A control apparatus for an internal combustion engine having a fuel injector and a catalyst provided in an exhaust pipe thereof for purifying emissions from said engine, comprising:

means for determining when said catalyst is warming up and outputting a temperature signal indicative thereof;

means for generating an operating parameter representing an operating condition of said engine;

air fuel ratio sensor means, disposed in said exhaust pipe upstream of said catalyst with respect to a flow of said emissions through said exhaust pipe, for detecting an amount of a predetermined component of said emissions and outputting an amount signal indicative thereof;

means for controlling, based on said operating signal, an amount of fuel provided to said engine by said fuel injector;

means for generating a first constant when said temperature signal indicates that said catalyst is warming up and a second constant when said temperature signal indicates that said catalyst has completed warming up; and means for correcting said fuel amount, in accordance with said amount signal and said first constant, to cause said controlling means to provide alternately to said engine, when said temperature signal indicates that said catalyst is warming up, a rich amount of fuel to achieve a rich air-fuel ratio and a lean amount of fuel to achieve a lean air fuel ratio with respect to a theoretical air-fuel ratio, and for correcting said fuel amount, in accordance with said amount signal and said second constant, to cause said controlling means to provide alternately to said engine, when said temperature signal indicates that said catalyst is has completed warming up, a second rich amount of fuel to achieve a second rich air-fuel ratio and a second lean amount of fuel to achieve a second lean air fuel ratio.

11. An apparatus as claimed in claim 10, wherein said first and second constants each represent a period of time to delay said correcting means from correcting said fuel amount.

12. An apparatus as claimed in claim 1, further comprising means for supplying secondary air to a portion of said exhaust pipe upstream of said catalyst when said temperature signal indicates that said catalyst is at a temperature below said predetermined temperature.

* * * * *